United States Patent
Prakash et al.

(10) Patent No.: US 7,961,640 B2
(45) Date of Patent: Jun. 14, 2011

(54) METHOD AND APPARATUS FOR CODEBOOK EXCHANGE IN A MULTIPLE ACCESS WIRELESS COMMUNICATION SYSTEM

(75) Inventors: Rajat Prakash, San Diego, CA (US); Sandip Sarkar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 748 days.

(21) Appl. No.: 11/923,967

(22) Filed: Oct. 25, 2007

(65) Prior Publication Data

US 2008/0101322 A1     May 1, 2008

Related U.S. Application Data

(60) Provisional application No. 60/854,898, filed on Oct. 26, 2006, provisional application No. 60/863,313, filed on Oct. 27, 2006.

(51) Int. Cl.
 *H04L 12/26* (2006.01)
(52) U.S. Cl. ......... 370/252; 370/310; 370/328; 370/230
(58) Field of Classification Search .................. 370/252, 370/310, 328, 329, 334, 339, 230
See application file for complete search history.

(56) References Cited

U.S. PATENT DOCUMENTS

| | | | |
|---|---|---|---|
| 6,112,244 A * | 8/2000 | Moore et al. | 709/228 |
| 7,139,328 B2 | 11/2006 | Thomas et al. | |
| 7,336,727 B2 | 2/2008 | Mukkavilli et al. | |
| 2005/0286663 A1 | 12/2005 | Poon | |
| 2006/0039489 A1 | 2/2006 | Ikram et al. | |
| 2006/0190251 A1 * | 8/2006 | Sandvall et al. | 704/236 |
| 2006/0223449 A1 | 10/2006 | Sampath et al. | |
| 2007/0049218 A1 * | 3/2007 | Gorokhov et al. | 455/102 |
| 2007/0055509 A1 * | 3/2007 | Vasilache et al. | 704/229 |
| 2007/0115909 A1 | 5/2007 | Wang et al. | |
| 2007/0149181 A1 * | 6/2007 | Lin et al. | 455/415 |
| 2007/0265037 A1 * | 11/2007 | Pan et al. | 455/563 |
| 2008/0076370 A1 * | 3/2008 | Kotecha et al. | 455/187.1 |
| 2008/0080449 A1 * | 4/2008 | Huang et al. | 370/342 |
| 2008/0080637 A1 * | 4/2008 | Khan et al. | 375/267 |

FOREIGN PATENT DOCUMENTS

| | | |
|---|---|---|
| WO | WO2004004370 | 1/2004 |
| WO | WO2006018710 A1 | 2/2006 |

OTHER PUBLICATIONS

International Search Report and Written Opinion—PCT/US07/082734, International Search Authority—European Patent Office, Jul. 17, 2008.

(Continued)

*Primary Examiner* — Kwang B Yao
*Assistant Examiner* — Nguyen Ngo
(74) *Attorney, Agent, or Firm* — Liem T. Do

(57) ABSTRACT

Methods and apparatus are disclosed for generating and exchanging codebooks in a multiple access wireless communication system. The codebooks include a plurality of preferred precoding matrices.

45 Claims, 16 Drawing Sheets

OTHER PUBLICATIONS

Love D J, Heath R W Jr: "Limited Feedback Unitary Precoding for Spatial Multiplexing Systems" IEEE Transactions on Information Theory, vol. 51, No. 8, Aug. 2005, pp. 2967-2976, IEEE Service Center, Piscataway, NJ, US, ISSN: 0018-9448.

Mondal B et al: "Algorithms for Quantized Preceded MIMO-OFDM Systems" Asilomar Conference on Signals, Systems and Computers. Oct. 28, 2005, pp. 381-385, Piscataway, NJ, USA, IEEE, ISBN: 978-1-4244-0131-4.

Partial International Search Report—PCT/US07/082734, International Search Authority—European Patent Office, Mar. 17, 2008.

Senhua Huang, Ling Qiu: "A Novel Receiver Aided Beamforming Technique" International Symposium on Personal, Indoor and Mobile Radio Communications, Sep. 11, 2005, pp. 2447-2451, Piscataway, NJ, USA, IEEE ISBN: 978-3-8007-29.

* cited by examiner

METHOD AND APPARATUS FOR CODEBOOK EXCHANGE IN A MULTIPLE ACCESS WIRELESS COMMUNICATION SYSTEM

This application claims the benefit of U.S. Provisional Patent Application Ser. No. 60/854,898, filed Oct. 26, 2006, entitled "A METHOD AND APPARATUS FOR CODEBOOK EXCHANGE IN A WIRELESS COMMUNICATION SYSTEM" and U.S. Provisional patent Application Ser. No. 60/863,313, filed Oct. 27, 2006, entitled "A METHOD AND APPARATUS FOR CODEBOOK EXCHANGE IN A WIRELESS COMMUNICATION SYSTEM," the entirety of both applications is also incorporated herein by reference.

BACKGROUND

I. Field

The present disclosure relates generally to wireless communication, and more particularly to codebook exchange in a wireless communication system, specifically a multiple access communication system.

II. Background

Wireless communication systems are widely deployed to provide various types of communication content such as voice, data and so on. These systems may be multiple-access systems capable of supporting communications with multiple users by sharing the by sharing the available system resources (e.g., bandwidth and transmit power). Examples of such multiple-access systems include code division multiple access (CDMA) systems, time division multiple access (TDMA) systems, frequency division multiple access (FDMA), 3GPP LTE ($3^{rd}$ Generation Partnership Project—Long Term Evolution) systems and Orthogonal Frequency Division Multiple Access (OFDMA) systems.

Generally, a wireless multiple-access communication system can simultaneously support communication for multiple wireless terminals. Each terminal communicates with one or more access networks, referred to herein as an access points or base stations, via transmissions on the forward and reverse links. The forward link (or downlink) refers to the communication link from the access networks to the terminals, and the reverse link (or uplink) refers to the communication link from the terminals to the access networks. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a spatial dimension. The MIMO system can provide improved performance (e.g., higher peak rates and/or coverage) if the additional dimensionalities created by the multiple transmit and receive antennas are utilized.

MIMO can be used in both a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access network to extract transmit beam-forming gain on the forward link when multiple antennas are available at the access network.

Space Division Multiple Access (SDMA) systems are dependent on multiple antennae at the transmitter. SDMA relies on the spatial information of the user and categorizes the users based on their spatial location. SDMA is compatible with any multiple access schemes such as TDMA, FDMA, CDMA, etc.

Space-Division multiple access (SDMA) enables creating parallel high-capacity spatial pipes through spatial multiplexing in order to offer superior performance in radio multiple access wireless communication systems. By using MIMO technology and exploiting spatial information of the location of mobile units within the cell, SDMA techniques have been developed. The radiation pattern of the access network, both in transmission and reception is adapted to each user to obtain highest gain in the direction of the mobile user. This is often done using phased array techniques.

Precoding is a way to achieve generalized beamforming in MIMO systems. Precoding enables multiple streams of the signals from the transmit antennas with independent and appropriate weighting such that the link throughout can be maximized at the receiver output.

Precoding defines a mapping from physical antennae to the signal transmitted to a specific user, although the user is oblivious of the physical antennae pattern, and receives the signal from the effective antennae defined by the precoder. A particular mapping is defined by a precoding matrix. The columns of a precoding matrix define a set of spatial beams that can be used by the access network. The access network uses only one column (e.g., one effective antennae) of the precoding matrix in Single Input Single Output (SISO) transmissions and multiple columns (e.g., multiple effective antennae) in MIMO transmissions.

Determining effective antennae and, thus, the precoding matrix is dependent on implementation and deployment. Deployment involves many transient factors, such as the location of the access terminal, environmental conditions, time of day and the like. Thus, for each deployment different sets of precoding matrices may be desired. The network layout, physical terrain, etc. can contribute to the choice of the set of precoding matrices. The set of such precoding matrix forms a codebook.

In view of at least the above, a need exists for a system and/or methodology for effectively and efficiently exchanging a codebook between the access network and the access terminal.

SUMMARY

The following presents a simplified summary of the disclosed aspects in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method for codebook exchange in a multiple access wireless communication system, such as Space Division Multiple Access (SDMA), is defined. The method includes providing for a plurality of preferred precoding matrices and generating a codebook at an access network, otherwise referred to herein as an access point or base station. The codebook includes a plurality of preferred precoding matrices. The method also includes communicating the codebook to one or more access terminals.

According to one aspect of the method generating a codebook may further include generating a codebook that includes a codebook identifier assigned by the access network. The codebook identifier, which in one specific aspect may have a sixteen (16)-bits length, serves to identify the codebook in the access terminal codebook cache for the purpose of verifying receipt of the codebook and for codebook assignment.

According to one aspect of the method communicating the codebook may further include querying the one or more access terminals to determine an identity of one or more codebooks currently stored at each access terminal, receiving a codebook status response from each of the one or more access terminals indicating the identity of one or more codebooks stored at each of the one or more access terminals and communicating the codebook to one or more access terminals if the codebook status response indicates that the codebook is not currently stored at the one or more access terminals. The identity of each codebook may be defined by a codebook identifier. In one aspect the codebook identifier is further defined as a sixteen (16)-bit codebook identifier although other codebook identifiers having different bit lengths are also possible and within the scope of the disclosed aspects.

A further aspect of the method provides for assigning the codebook to one or more access terminals for a predetermined sector in the active set of communication links. Assigning the codebook for a predetermined sector in the active set of communication links may include querying the one or more access terminals to determine an identity of one or more codebooks currently stored at each access terminal, receiving a codebook status response from each of the one or more access terminals indicating the identity of one or more codebooks stored at each of the one or more access terminals and assigning the codebook to one or more access terminals for a predetermined sector in the active set of communication links, if the codebook status response for the one or more access terminals indicates that the codebook is currently stored at the one or more access terminals.

Additionally, the method may provide for generating a codebook that includes identification of one or more clusters. The clusters identify a set of the precoding matrices and, as such, a set of beams in the cluster. Thus, the clusters may identify a starting beam index and an ending beam index. The method may further provide for generating a codebook that includes an overlap cluster map that indicates one or more clusters authorized to potentially overlap.

According to another aspect, a network access apparatus for generating and communicating codebooks in a multiple access wireless communication system, such as SDMA, includes at least one processor and a memory coupled to the at least one processor. The apparatus additionally includes a codebook generator stored in the memory and executable by the at least one processor. The codebook generator is operable to provide for a plurality of preferred precoding matrices and generate a codebook that includes a plurality of preferred precoding matrices. The apparatus also includes a codebook exchanger stored in the memory and executable by the at least one processor. The codebook exchanger is operable to communicate the codebook to the one or more access terminals.

According to yet another aspect, an apparatus for generating and communicating codebooks in a multiple access wireless communication system, such as SDMA or the like, includes means for providing for a plurality of preferred precoding matrices and means for generating a codebook at an access network. The codebook includes a plurality of preferred precoding matrices. The apparatus additionally includes means for communicating the codebook to one or more access terminals.

Yet another aspect relates to a computer-readable medium. The medium includes code for causing a computer to provide for a plurality of preferred precoding matrices and code for causing a computer to generate a codebook at an access network. The codebook includes a plurality of preferred precoding matrices. The medium additionally includes code for causing a computer to communicate the codebook to one or more access terminals.

A further aspect is provided for by an integrated circuit that executes computer-executable instructions for generating and communicating codebooks in a multiple access wireless communication system, such as SDMA. The instructions include providing for a plurality of preferred precoding matrices and generating a codebook at an access network. The codebook includes a plurality of preferred precoding matrices. The instructions additionally include communicating the codebook to one or more access terminals.

According to an aspect, a method for receiving a codebook associated with a multiple access wireless communication system, such as SDMA, is defined. The method includes receiving a codebook from an access network and storing the received codebook in a codebook cache. The codebook includes on or more preferred precoding matrices.

According to another aspect, an access terminal apparatus for receiving and storing codebooks for a multiple access wireless communication system is defined. The apparatus includes at least one processor and a memory coupled to the at least one processor. The apparatus additionally includes a codebook module stored in the memory and executable by the at least one processor. The codebook module is operable to receive a codebook from an access network. The codebook includes on or more preferred precoding matrices. The apparatus also includes a codebook cache stored in the memory and operable for storing the received codebook.

According to yet another aspect, an apparatus for receiving and storing codebooks in a multiple access wireless communication system includes means for receiving a codebook from an access network. The codebook includes on or more preferred precoding matrices. The apparatus additionally includes means for storing the received codebook in a codebook cache.

Yet another aspect relates to a computer-readable medium. The medium includes code for causing a computer to receive a codebook from an access network. The codebook includes on or more preferred precoding matrices. The medium also includes code for causing a computer to store the received codebook in a codebook cache.

Another related aspect is provided for by an integrated circuit that executes instructions for receiving and storing codebooks in a multiple access wireless communication system. The instructions include receiving a codebook from an access network, and storing the received codebook in a codebook cache. The codebook includes on or more preferred precoding matrices.

To the accomplishment of the foregoing and related ends, one or more aspects include the features hereinafter fully described and particularly pointed out in the claims. The following description and the annexed drawings set forth in detail certain illustrative aspects of the disclosed aspects. These aspects are indicative, however, of merely a few of the various ways in which the principles of various aspects may be employed. Further, the disclosed aspects are intended to include all such aspects and their equivalents.

DETAILED DESCRIPTION

Figure 1:
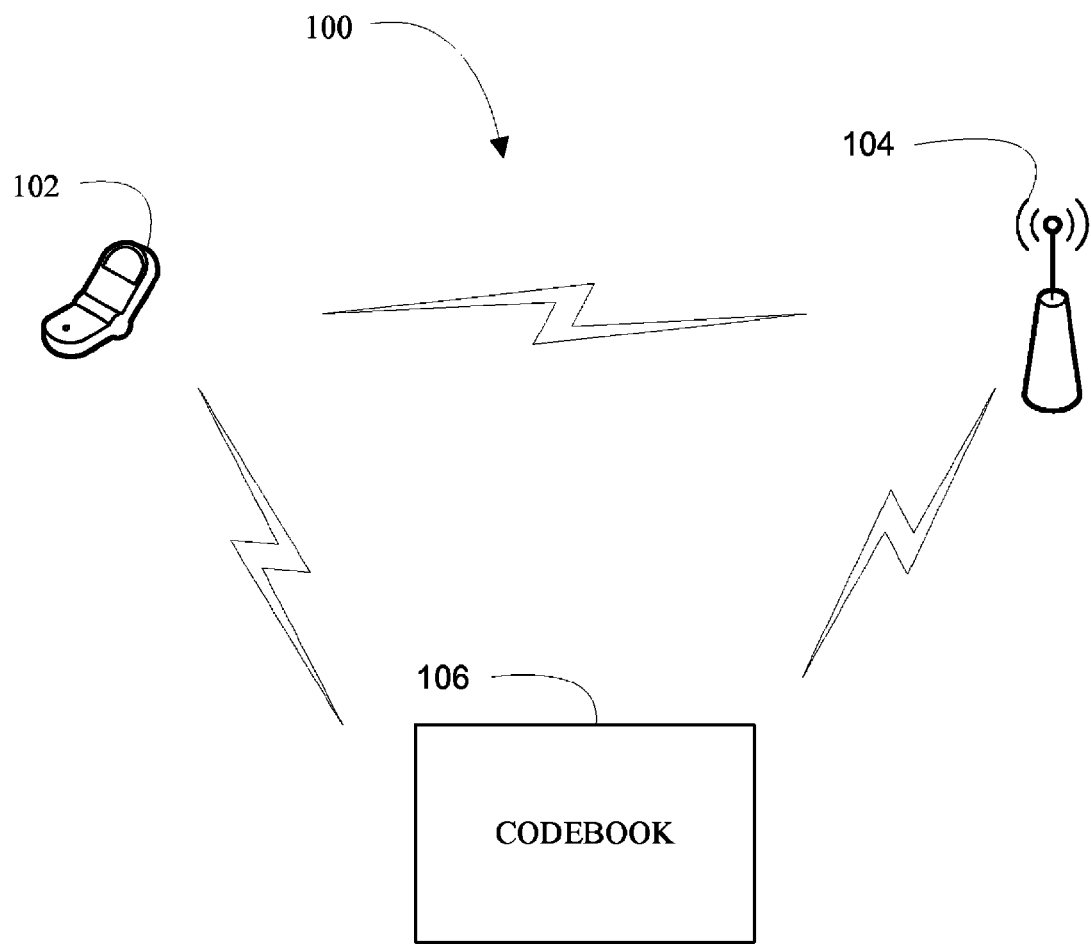
FIG. 1 illustrates a wireless communication system in accordance with various aspects set forth herein.

Various aspects are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network, such as the Internet, with other systems by way of the signal).

Furthermore, various aspects are described herein in connection with an access terminal and/or an access network. An access terminal may refer to a device providing voice and/or data connectivity to a user. An access wireless terminal may be connected to a computing device such as a laptop computer or desktop computer, or it may be a self-contained device such as a cellular telephone. An access terminal can also be called a system, a subscriber unit, a subscriber station, mobile station, mobile, remote station, remote terminal, a wireless access network, wireless terminal, user terminal, user agent, user device, or user equipment. A wireless terminal may be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. An access network, otherwise referred to as an access point, a base station, and/or a base station controller (BSC), may refer to a device in an access network that communicates over the air-interface, through one or more sectors, with wireless terminals. The access network may act as a router between the wireless terminal and the rest of the access network, which may include an Internet Protocol (IP) network, by converting received air-interface frames to IP packets. The access network also coordinates management of attributes for the air interface.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ), and integrated circuits such as read-only memories, programmable read-only memories, and electrically erasable programmable read-only memories.

Various aspects will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to the drawings, FIG. 1 illustrates a wireless communication system 100 in accordance with various aspects presented herein. Various modes can be utilized to improve communication in wireless system 100 including pre-coding, SDMA, multiple input and multiple output (MIMO), and a transmit/receive diversity. As illustrated, an access terminal 102 is in wireless communication with an access network 104. It should be appreciated that while one access terminal 102 and one access network 104 are illustrated for simplicity, there can be more than one of each.

Access network 104 includes transmit antennas that can generate beams covering predetermined areas, resulting in a fixed beam pattern. Access network 104 supports techniques such as preceding, SDMA, and/or MIMO. Access network 104 performs pre-processing for whichever technique is utilized. For example, for preceding, a particular vector is utilized that can modulate all of a user's transmissions for some time period. For MIMO preceding, a set of vectors can be used to modulate the transmissions from access network 104.

Codebook 106 includes entries of different vectors and/or matrices that may correspond to multiple transmission modes, such information can be pre-defined. Each entry can correspond to a mode of transmission or a form of spatial processing (e.g., preceding, SDMA, MIMO, etc.). For example, codebook 106 can contain a set of sixty-four entries, however, there can be any number of entries and sixty-four is an arbitrary number. In accordance with present aspects, codebook 106 can be customized for access network(s) 104 or sectors or access terminal(s) 102 in communication with access network(s) 104. For example and not limitation purposes, codebook 106 can support a plurality of users applying multiple transmission modes. It should be noted that while one codebook is shown 106, in present aspects, there can more than one codebook in system 100 and more than one codebook 106 can be associated with a given deployment.

Access Terminal 102 can notify access network 104 of the codebook entries that access terminal 102 would prefer. Depending on communication system requirements, codebook 106 can be known by either or both the access terminal 102 and the access terminal 104. In systems pertaining to present aspects, codebook 106 will be generated by the access network 104, communicated to the access terminal 102 and stored in access terminal cache (i.e., temporary storage). Thus, in present aspects, codebook 106 is known by both the access network 104 and the access terminal 102. As the access terminal 102 moves among different access networks 104, the access terminal 102 may acquire and apply a different codebook 106 associated with the access network 104 in that particular geographic region. The acquisition and/or assignment of a new codebook 106 may be performed automatically by the access terminal 102 autonomously (e.g., by a processor accessing the different codebook) or by access network 104 notifying access terminal 102 of a new assignment.

In SDMA, multiple users may be scheduled simultaneously on the same time-frequency resource where their spatial signatures may be distinguished. In SDMA, a sector is split into virtual sectors such that user devices in the different regions share the same channel resources, thereby achieving higher spatial reuse. Thus, in SDMA there may be a separate transmission mode that potentially provides robust signaling. This transmission mode may be used to transmit control and/or broadcast data. Every virtual sector could be further subdivided into a set of narrower spatial beams so that a particular beam (or linear combination of beams) within a virtual sector can be applied to a particular user device, thereby increasing antenna gain to the user device and limiting spatial spread of the interference created by the transmission.

SDMA is useful in high SNR scenarios when the capacity is near the non-linear region. In these aspects, overlapping multiple users increases the number of available channels (dimensionality) at the cost of decreased SNR to each user. Given that at high SNR the users are in the non-linear capacity region, this approach increases system capacity. On the other hand, in low SNR regimes (linear region of the capacity curve), it is usually not beneficial to take power away from a user while increasing the dimensions. In these aspects, it is beneficial to increase the SNR of the user through techniques, such as precoding where the precoding could be over multiple streams or flows of information (MIMO preceding). These aspects utilize a pre-defined set of beams to transmit to the user. In a MIMO scheme, there are multiple streams transmitted to the same user, wherein the data can be transmitted along multiple eigen-vector directions.

Utilizing the disclosed techniques, seamless operation of multiple input single output/multiple input multiple output (MISO/MIMO) precoding and SDMA is enabled by applying precoding in the beam-space of SDMA beams. Specifically, if there are a few virtual sectors where SDMA is enabled, each such region further consists of a set of narrow spatial beams. These narrow beams form a basis for the transmissions that occur within that virtual sector.

The decision of which mode to utilize (preceding, SDMA, MIMO, or a combination thereof) can be based on one or more channel conditions. A channel quality indicator (CQI) technique can be used to determine which vector to use, e.g. provides the highest or lowest value. For preceding, a particular entry can be utilized that pre-processes the user's transmissions. For MIMO precoding a set of vectors can be utilized to pre-process the access network's transmissions. Precoding provides a higher SNR, potentially resulting in higher peak rates and better coverage.

Figure 2:
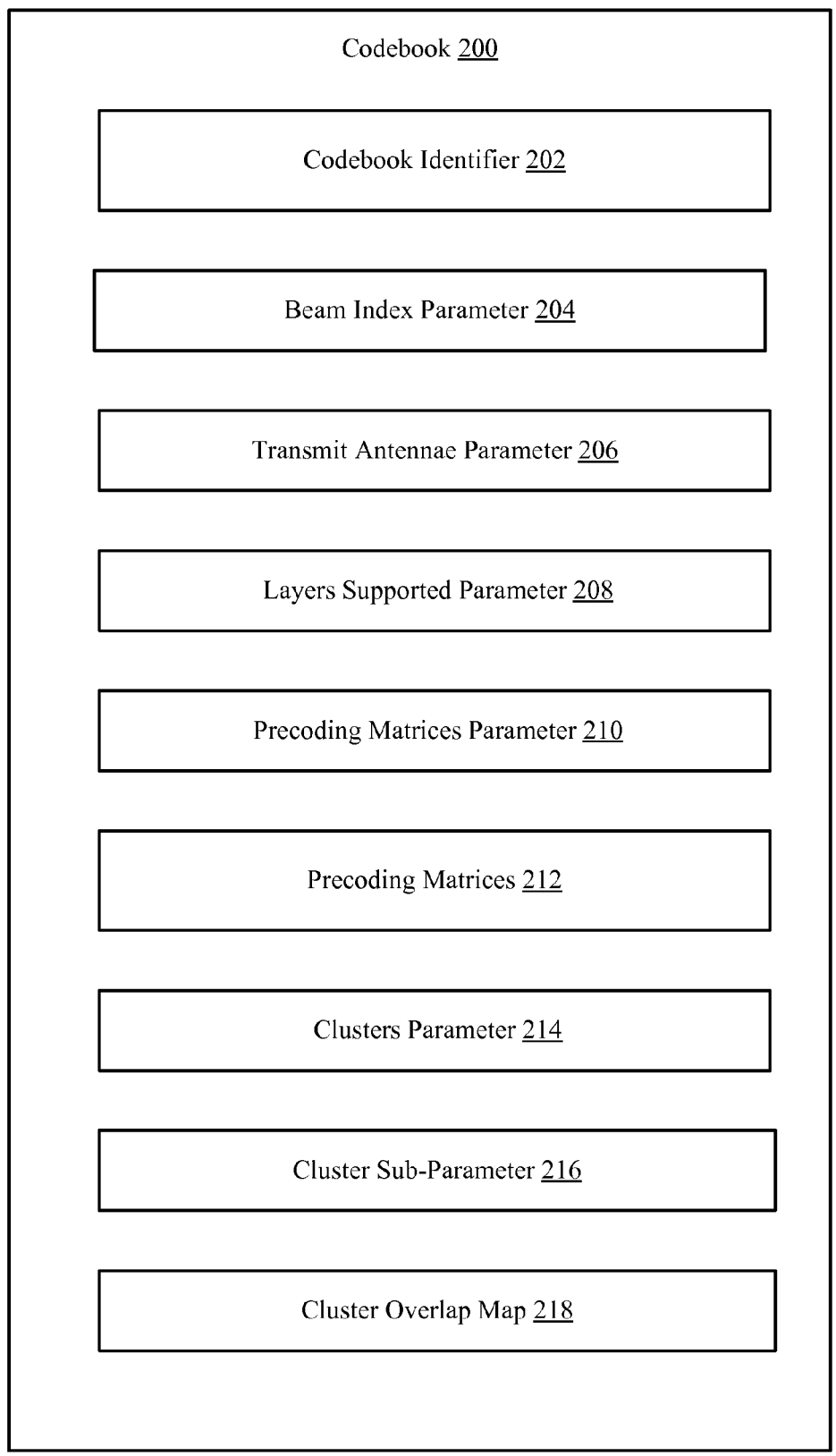
FIG. 2 is a block diagram of an exemplary codebook detailing various parameters in accordance with various aspects described herein.

Referring to FIG. 2, in accordance with present aspects, a block diagram detailing the exemplary structure of a codebook 200 is depicted. The codebook 200 may include some, but not all, of the following described parameters. For example, codebook 200 may include a codebook identifier 202 that serves to distinguish the codebook from other codebooks. In some aspects, the codebook identifier 202 may be a sixteen (16)-bit quantity identifier assigned by the access network. A sixteen (16)-bit codebook identifier assures minimal collisions in the identification of the codebook among various vendors. However, the aspects herein disclosed are not limited to a sixteen (16)-bit codebook identifier configuration and other bit-length codebook identifiers are also possible and within the scope of the disclosed aspects. As will be described in detail infra. codebook identifier 202 may be used during codebook exchange and assignment to verify and retrieve the requisite codebook from access terminal cache.

Additionally, codebook 200 may include a beam index parameter 204 that index a beam in the codebook. Thus, beam index parameter 204 may, by way of example, indicate one or more of the following: (1) no preferred precoding or SDMA matrix; (2) a preferred SISO (Single Input, Single Output) precoding or SDMA transmission on a spatial beam; and (3) a preferred MIMO (Multiple Input, Multiple Output) precoding or SDMA transmission on a set of spatial beams (e.g. more that one column of the precoding matrix). The beam index parameter 204 may also indicate one or more sets of allowable overlap beams.

Codebook 200 may also include a transmit antennae parameter 206 that identifies the maximum number of antennae implemented by the access network. Additionally, codebook 200 may also include a layers supported parameter 208 that identifies the maximum number of layers supported in the communication system. The maximum number of layers supported is otherwise referred to in the art as the spatial order. The maximum number of antennae and the maximum layers supported are used to define the size of the precoding matrices. Thus, the size of the precoding matrices may be defined as the product of the maximum number of transmit antennae and the maximum number of layers supported.

Codebook 200 may additionally include a precoding matrices parameter 210 that identifies the number of precoding matrices in the codebook. As previously noted, the codebook 200 may typically include 64 precoding matrices; however, other quantities of precoding matrices are also configurable.

Additionally, codebook 200 will include a plurality of preferred precoding matrices 212 that provide for a preferred mapping between effective antennae and physical antennae.

Codebook 200 may additionally provide for clusters. Clusters are defined as a group of precoding matrices (e.g. a set of beams) defined by a coverage space. The columns of the matrices in different clusters are used to form spatial beams covering spatially distinct group of users/access terminals. If the access terminal feeds back a beam index within a cluster, the access network will treat this as an indication that it may schedule other access terminals on different clusters, i.e., allowing for SDMA to occur. As such, codebook 200 may include a cluster parameter 214 that defines the number of clusters in the codebook. Each cluster will have a cluster sub-parameter 216 that identifies the number of beams in the cluster. The number of beams in the cluster may be identified by a starting beam index and an ending beam index Additionally, codebook 200 may include a cluster overlap map 218 that indicates the clusters that are authorized to potentially overlap. The cluster overlap map 218 may be formed as a matrix of size (number of precoding matrices)×(number of precoding matrices). Thus, for a codebook having 64 precoding matrices, the cluster overlap map may have a matrix the size of 4096. The overlap map matrix may be formed such that "1"'s may indicate allowable overlaps and "0"'s may indicate no overlap allowed. Additionally, the access terminal should take into account overlapping clusters when reporting the CQI (Channel Quality Indication) to the access network.

Figure 3:
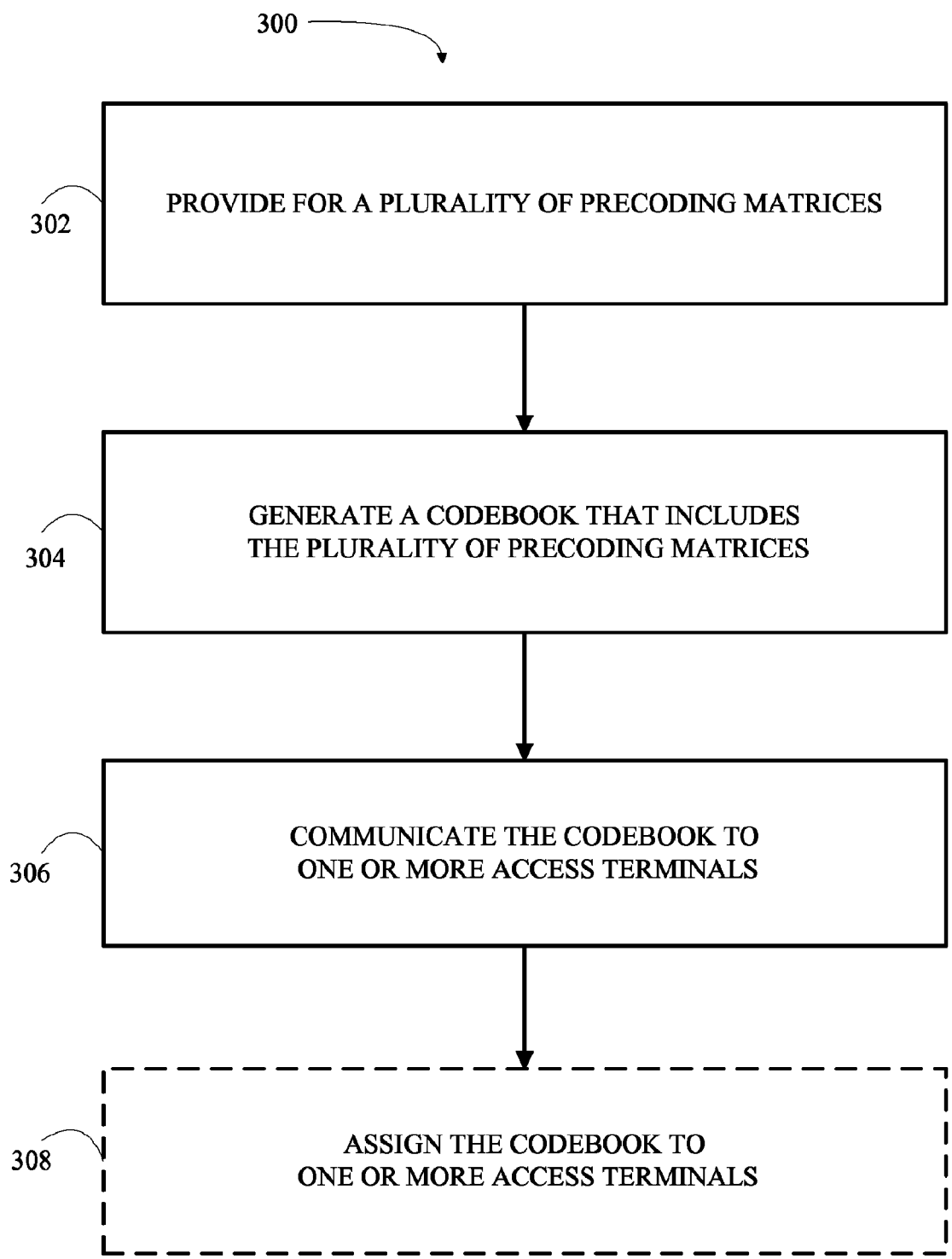
FIG. 3 is a flow diagram illustrating aspects of a method for generating and exchanging a codebook in a multiple access wireless communication system in accordance with various aspects described herein.

FIG. 3 provides a flow diagram of a method 300 for generating and exchanging codebooks in a multiple access wireless communication system. It is to be appreciated that method 300 can be performed by, for example, an access network (e.g., access network 104) and/or any other appropriate network entity. At Block 302, a plurality of preferred precoding matrices are provided. For example, in one aspect 64 precoding matrices may be provided. Each matrix will define a mapping between effective antennae and physical antennae and, thus, provide for beam formation. The access terminal will choose a precoding matrix from among the plurality of preferred precoding matrices based on implementation and deployment factors.

At Block 304, a codebook is generated at the access network. The codebook includes the plurality of preferred precoding matrices. Additionally, the generated codebook may include a codebook identifier, such as a sixteen (16)-bit codebook identifier or any other suitable bit-length codebook identifier. The generated codebook may include the identification of clusters, which are defined as groupings of precoding matrices. In addition to the number of clusters in the codebook, the codebook may include a cluster beam index that indicates the number of beams in the cluster, the starting beam index and the ending beam index. In some aspects, the generated codebook may additionally include a cluster overlap map that identifies overlapping clusters.

Figure 4:
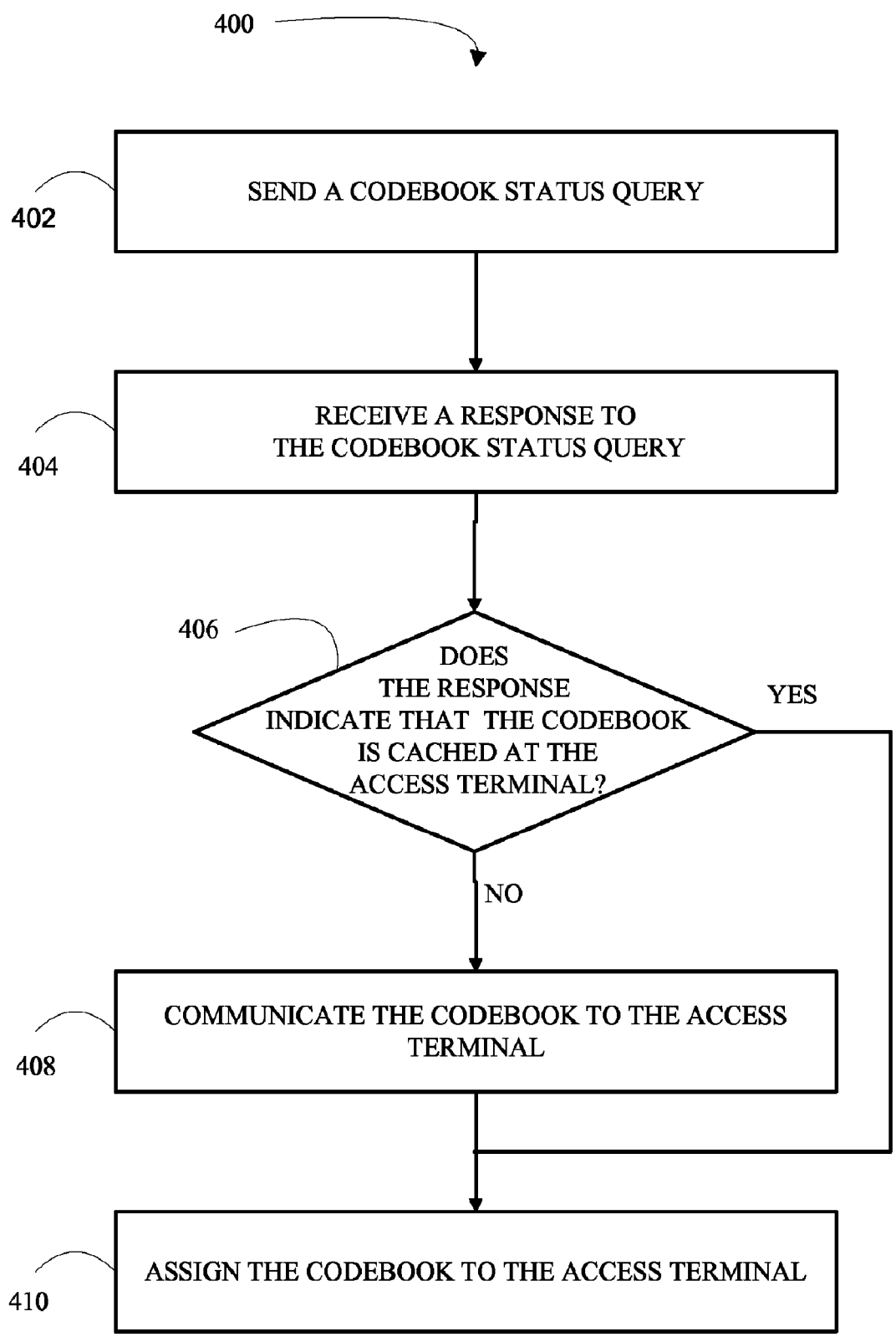
FIG. 4 is a flow diagram of a method for codebook exchange and assignment in a multiple access wireless communication system in accordance with various aspects described herein.

At Block 306, the codebook is communicated to one or more access terminals that are currently within reception range of the access network. At optional Block 308, the codebook is assigned for one or more of the access terminals. Communication of the codebook may coincide with assignment of the codebook or the assignment may occur independent of the communication of the codebook. FIG. 4, which will be discussed infra. provides a detailed method for codebook communication and assignment.

FIG. 4 is flow diagram of a method 400 for codebook exchange and assignment in a multiple access wireless communication system, according to present aspects. It is to be appreciated that method 400 can be performed by, for example, an access network (e.g., a base station 104) and/or any other appropriate network entity. At Block 402, the access network communicates a codebook status query message to an access terminal. The codebook status query message is communicated on the forward link. A codebook status query may be communicated by each new access network added to the active set of access networks.

At Block 404, the access network receives a codebook status response that indicates the codebooks that are currently stored in the cache of the access terminal. The codebook status response is communicated on the reverse link and identifies cached codebooks according to the corresponding codebook identifier. By providing each access network, such as base station, the ability to query the access terminals for current codebook assignments, there is no need for sharing the access terminal codebook cache status with other access networks. This reduces the size and complexity of the session information that has to be shared between access networks.

At Decision Block 406, the access network determines if the access terminal currently has the associated codebook in access terminal cache. This determination is performed by checking for the codebook identifier associated with the access network in the codebook status response. If the determination is made that the access terminal does not currently have the codebook in access terminal cache then, at Block 408, the access terminal communicates the codebook to the access terminal. The access network may communicate the codebook on the forward link as part of a codebook set-up message.

At Block 408, once the codebook has been communicated to the access terminal or after a determination is made that the codebook is currently stored in access terminal cache, the access network may assign the codebook to the access terminal. Assigning the codebook provides for implementing the codebook for a particular sector in the active set. The codebook assignment is communicated on the forward link.

Figure 5:
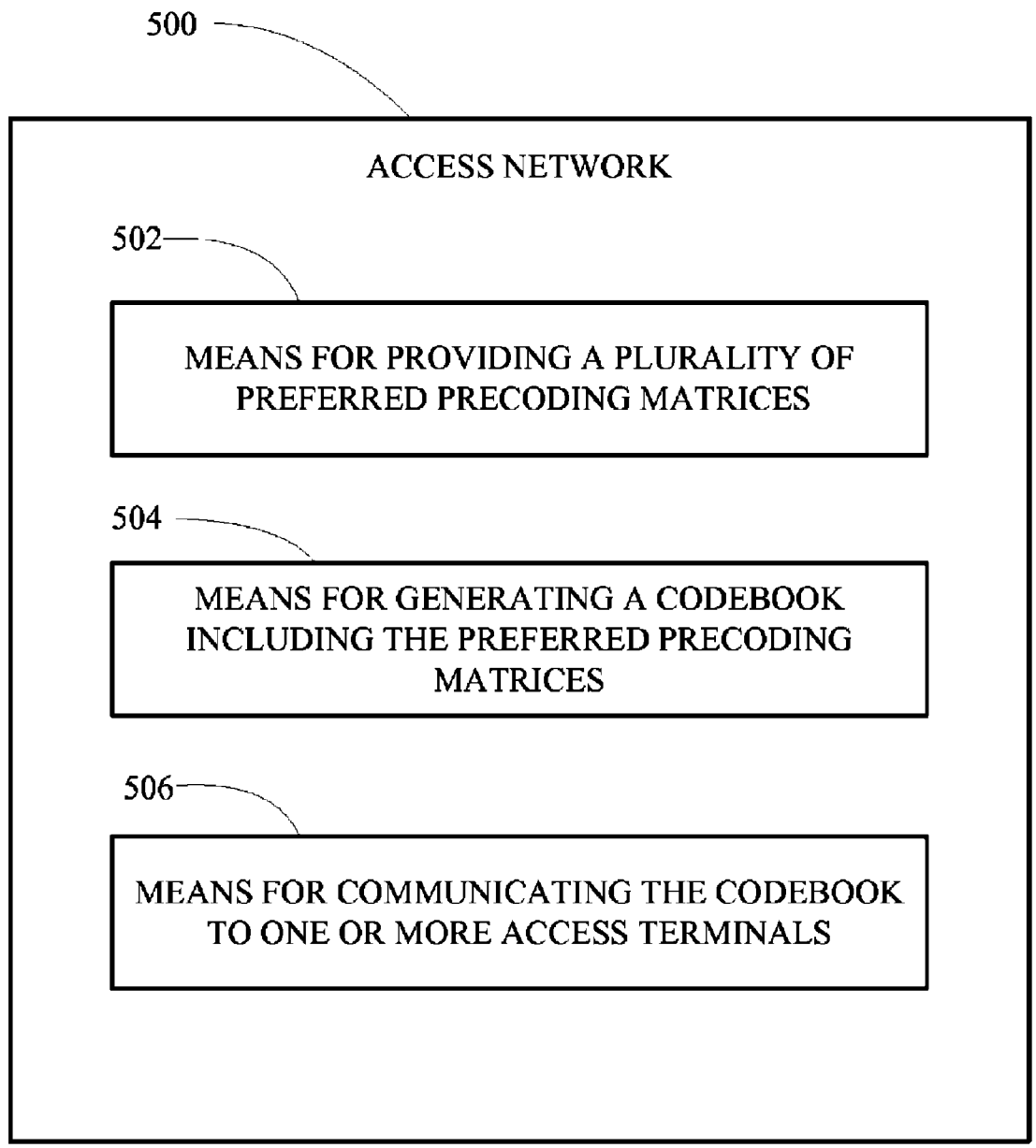
FIG. 5 is a block diagram of a network access apparatus for generating and exchanging codebooks in accordance with various aspects described herein.

FIG. 5 depicts a block diagram of an access network 500 configured to generate and exchange a codebook in a multiple access wireless communication system, according to various aspects. The means herein disclosed may be carried out by computer-readable medium (e.g. software) stored in device memory, hardware, such as processing subsystems or the like or a combination of both computer-readable medium and hardware. The access network 500 includes means 502 for providing a plurality of preferred precoding matrices. Each matrix will define a mapping between effective antennae and physical antennae and, thus, provide for beam formation. The access terminal will choose a precoding matrix from among the plurality of preferred precoding matrices based on implementation and deployment factors.

The access network 500 additionally includes means 504 for generating a codebook including the plurality of preferred precoding matrices. Additionally, the generated codebook may include a codebook identifier, such as a sixteen (16)-bit codebook identifier or any other bit-length codebook identifier. The generated codebook may include the identification of clusters, which are defined as groupings of precoding matrices. In addition, to the number of clusters in the codebook, the codebook may include a cluster beam index that indicates the number of beams in the cluster, the starting beam index and the ending beam index. In some aspects, the generated codebook may additionally include a cluster overlap map that identifies overlapping clusters.

Additionally, the access network includes means 506 for communicating the codebook to one or more access terminals. Communicating the codebook may include querying the access terminals for codebook status, receiving a response to the codebook status query and communicating the codebook to the access terminal, if the response indicates that the codebook is not currently stored in access terminal memory.

Figure 6:
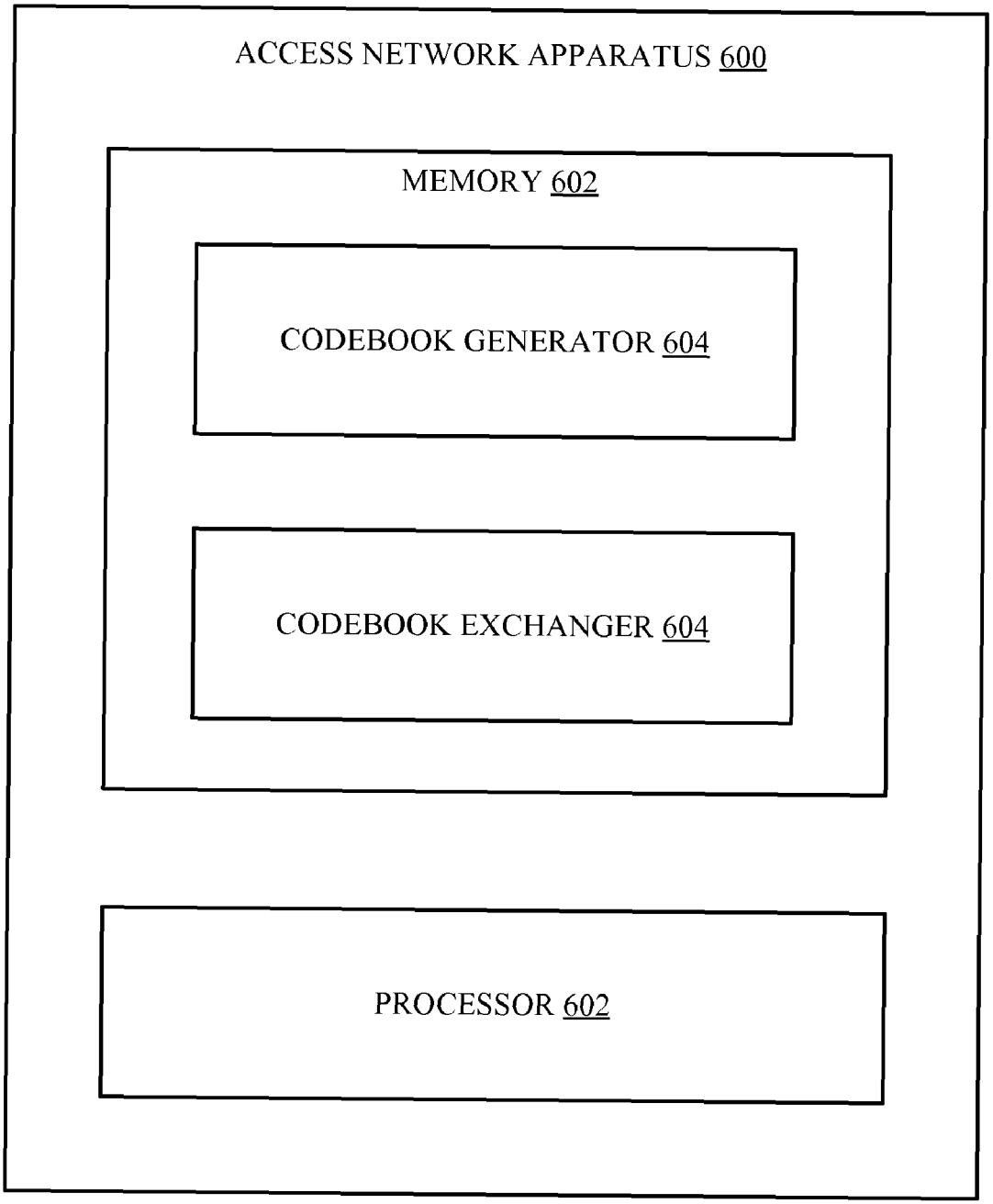
FIG. 6 is a block diagram of a network access device configured for generating and exchanging codebooks in accordance with various aspects.

FIG. 6 depicts a block diagram of an access network apparatus 600, according to various aspects. The access network apparatus may be a single device or multiple devices configured to act in unison to perform the functions herein described. The access network includes at least one processor 602 and memory 604 coupled to processor 602. The processor 602 may be an application-specific integrated circuit ("ASIC"), or other chipset, processor, logic circuit, or other data processing device. The memory 604 may comprise volatile and nonvolatile memory such as read-only and/or random-access memory (RAM and ROM), EPROM, EEPROM, flash cards, or any memory common to computer platforms. Further, memory 604 may include one or more flash memory cells, or may be any secondary or tertiary storage device, such as magnetic media, optical media, tape, or soft or hard disk.

The access network 600 additionally includes a codebook generator 606 stored in the memory 604 and executable by the at least processor 602. The codebook generator 606 is operable to generator a codebook including a plurality of preferred precoding matrices. Additionally, the generated codebook may include a codebook identifier, such as a sixteen (16)-bit codebook identifier or any other bit-length codebook identifier. The generated codebook may include the identification of clusters, which are defined as groupings of precoding matrices. In addition, to the number of clusters in the codebook, the codebook may include a cluster beam index that indicates the number of beams in the cluster, the starting beam index and the ending beam index. In some aspects, the generated codebook may additionally include a cluster overlap map that identifies potentially overlapping clusters.

The access network 600 additionally includes a codebook exchanger 608 stored in the memory 604 and executable by the at least processor 602. The codebook exchanger 608 is operable to communicate the codebook to one or more access terminals. Communicating the codebook may include querying the access terminals for codebook status, receiving a response to the codebook status query and communicating the codebook to the access terminal, if the response indicates that the codebook is not currently stored in access terminal memory.

Figure 7:
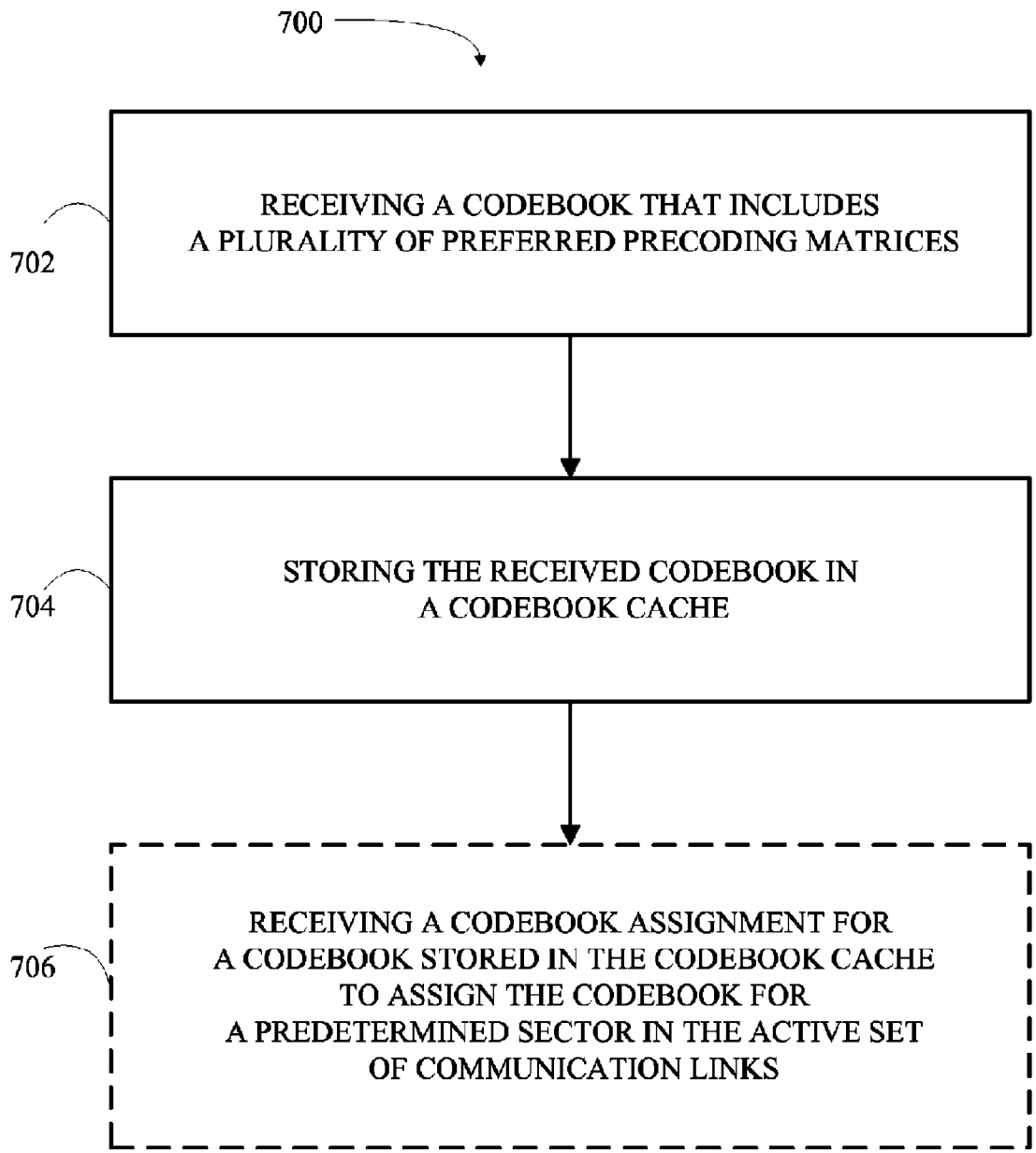
FIG. 7 is a flow diagram illustrating aspects of a method for receiving and storing a codebook at an access terminal in accordance with various aspects.

FIG. 7 provides a flow diagram of a method 700 for receiving and storing a codebook at an access terminal in a multiple access wireless communication system. It is to be appreciated that method 700 can be performed by, for example, an access terminal and/or any other appropriate device in wireless communication with the access network. At Block 702, the access terminal receives a codebook that includes a plurality of preferred precoding matrices. As described in relation to FIG. 8 discussed infra. the receipt of the codebook may be precipitated by a status query and subsequent response. Receipt of the codebook may occur on the forward link.

At Block 704, the received codebook is stored in codebook cache according to the codebook identification included in the codebook. Generally, if the access terminal is in an idle state when the codebook is received, the access terminal may be configured to cache the codebook or, in alternate aspect, the access terminal may be configured to disregard the codebook cache entries. Additionally, the access terminal may be configured to delete codebooks from the cache when the terminal is powered down or otherwise goes through a power cycle. Also, in the instance in which the codebooks are cached in non-volatile memory, the access terminal may be configured to delete the codebooks from memory upon absence of a power source (e.g., battery). In such aspects, the restoration of the power source will typically require the access terminal to re-acquire necessary codebooks from the access network, to restore the codebook cache as needed.

At optional Block 706, a codebook assignment is received for a codebook stored in the codebook cache. The assignment assigns the identified codebook to a predetermined sector in the active set of communication links. Assignment of the codebook may occur in conjunction with the communication of the codebook or the assignment may occur at any point in time after the codebook has been communicated and stored at the access terminal. The access terminal is typically configured to maintain (i.e., not delete) any cache entries that are currently assigned by sectors in the active set of communication links.

Figure 8:
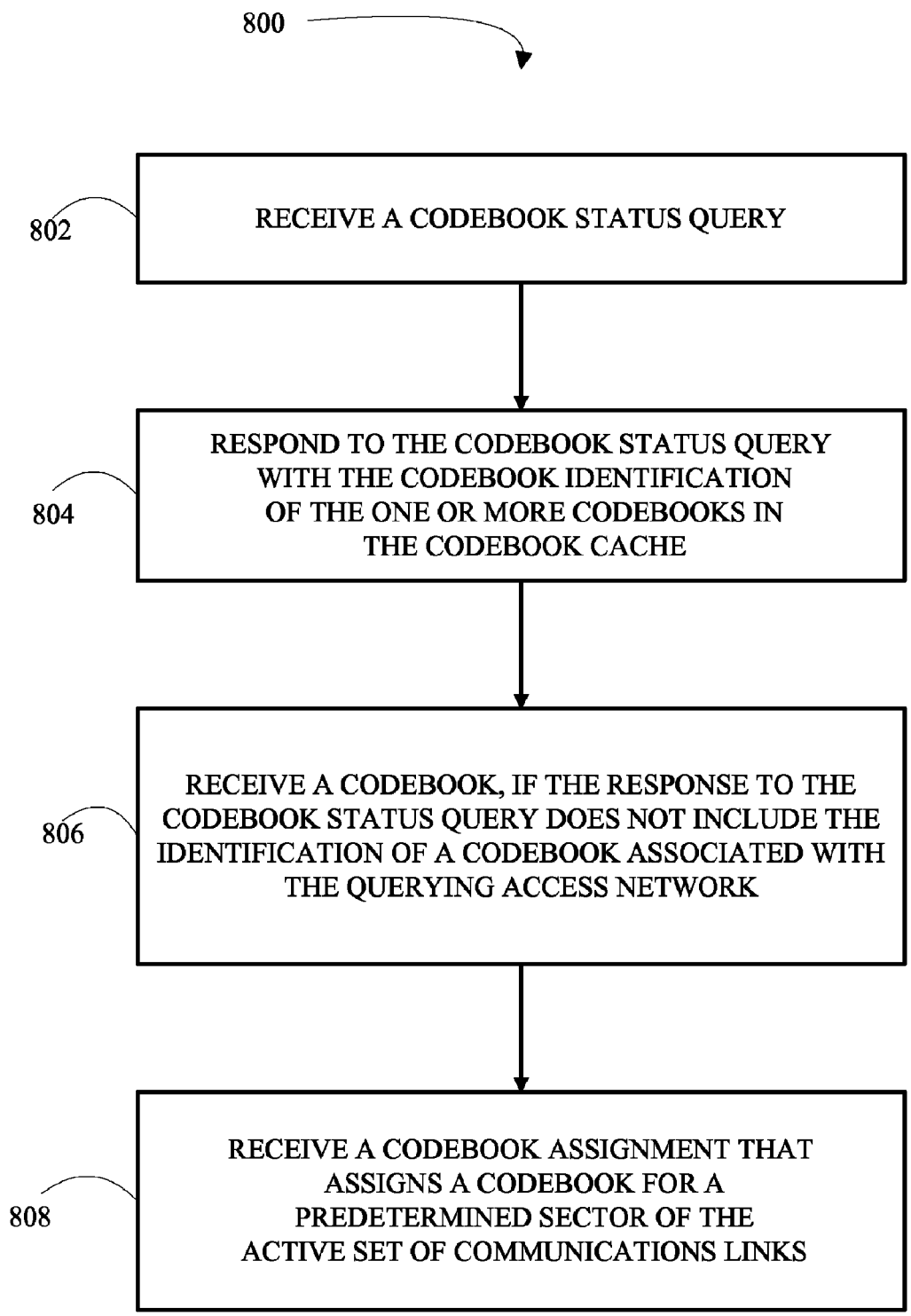
FIG. 8 is a flow diagram illustrating aspects of a method for receiving, storing and assigning a codebook at an access terminal in accordance with an aspect.

FIG. 8 is flow diagram of a method 800 for receiving and assigning a codebook at an access terminal in a multiple access wireless communication system, according to present aspects. It is to be appreciated that method 800 can be performed by, for example, an access terminal and/or any other appropriate device in wireless communication with the access network. At Block 802, the access terminal receives a codebook status query message communicated from the access network. The codebook status query message may be communicated on the forward link. A codebook status query may be communicated by each new access network added to the active set of access networks.

At Block 804, a codebook status response is communicated to the access network that indicates the codebooks that are currently stored in the cache of the access terminal. The codebook status response may be communicated on the reverse link and identifies cached codebooks according to the corresponding codebook identifier. By providing each access network, such as base station, the ability to query the access terminals for current codebook assignments, there is no need for sharing the access terminal codebook cache status with other access networks. This reduces the size and complexity of the session information that has to be shared between access networks.

At Block 806, a codebook is received by the access terminal, if the response to the codebook status query indicates that the codebook associated with the access network that initiated the query is not currently stored in the codebook cache of the access terminal. The access terminal may receive the codebook on the forward link as part of a codebook set-up message.

At Block 808, once the codebook has been received by the access terminal, the terminal may receive a codebook assignment that assigns the codebook for a particular sector in the active set of communication links. The codebook assignment may be communicated on the forward link.

Figure 9:
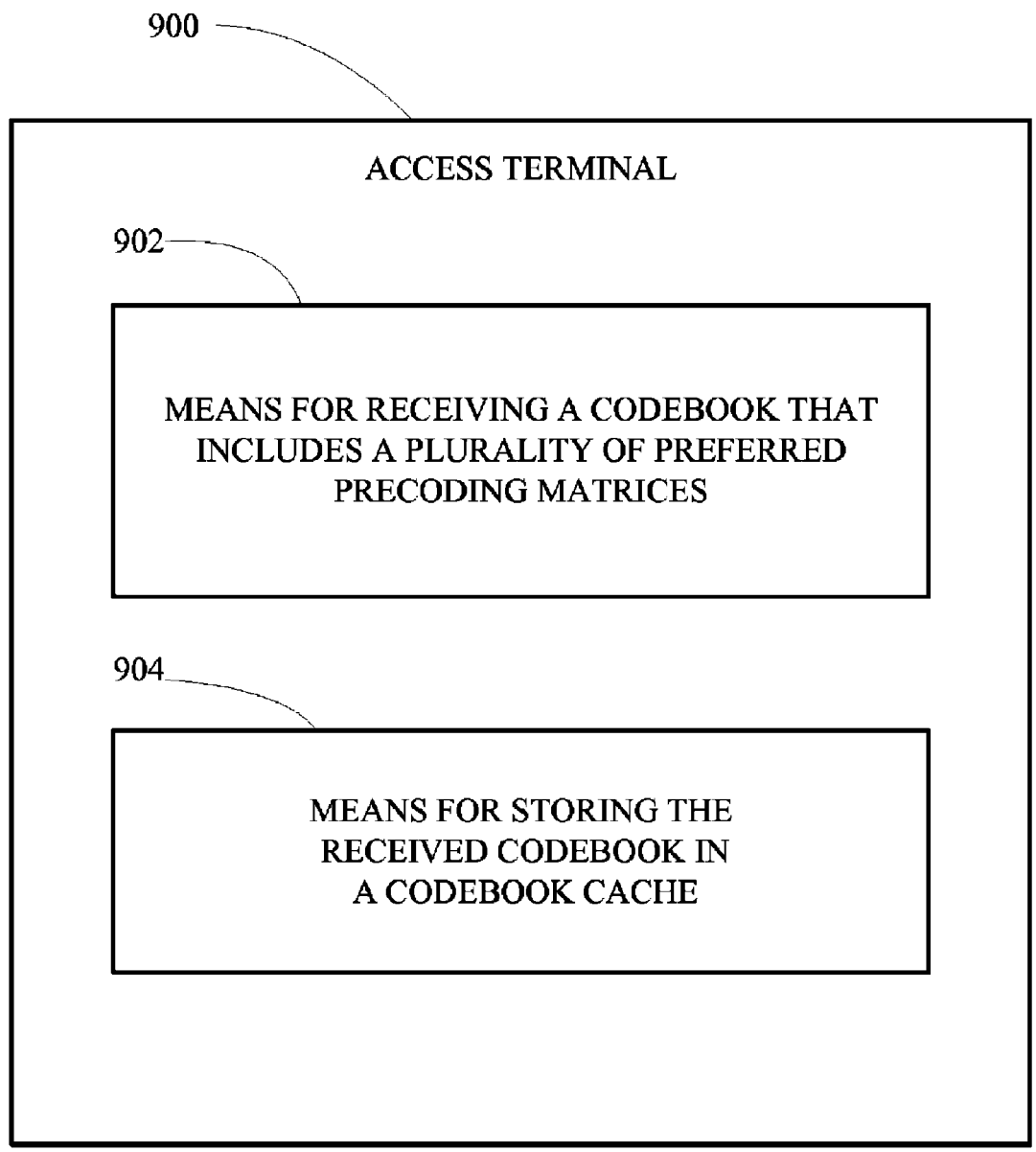
FIG. 9 is a block diagram of an access terminal for receiving and storing codebooks in a multiple access wireless communication system in accordance with various aspects.

FIG. 9 depicts a block diagram of an access terminal 900 configured to receive and store a codebook in a multiple access wireless communication system, according to various aspects. The means herein disclosed may be carried out by computer-readable medium (e.g. software) stored in device memory, hardware, such as processing subsystems or the like or a combination of both computer-readable medium and hardware. The access terminal 900 includes means 902 for receiving a codebook that includes a plurality of preferred precoding matrices. Each matrix will define a mapping between effective antennae and physical antennae and, thus, provide for beam formation. The access terminal will choose a precoding matrix from among the plurality of preferred precoding matrices based on system configuration and deployment.

The access terminal 900 additionally includes means 904 for storing the received codebook in codebook cache. The codebook may be stored according to a codebook identifier, such as a sixteen (16)-bit identifier or any other bit-length codebook identifier, included in the codebook. Codebooks may be stored during an idle state of the access terminal or otherwise disregarded during the idle state. Codebooks will typically remain in the codebook cache until the device is powered down or otherwise undergoes a power state change.

Figure 10:
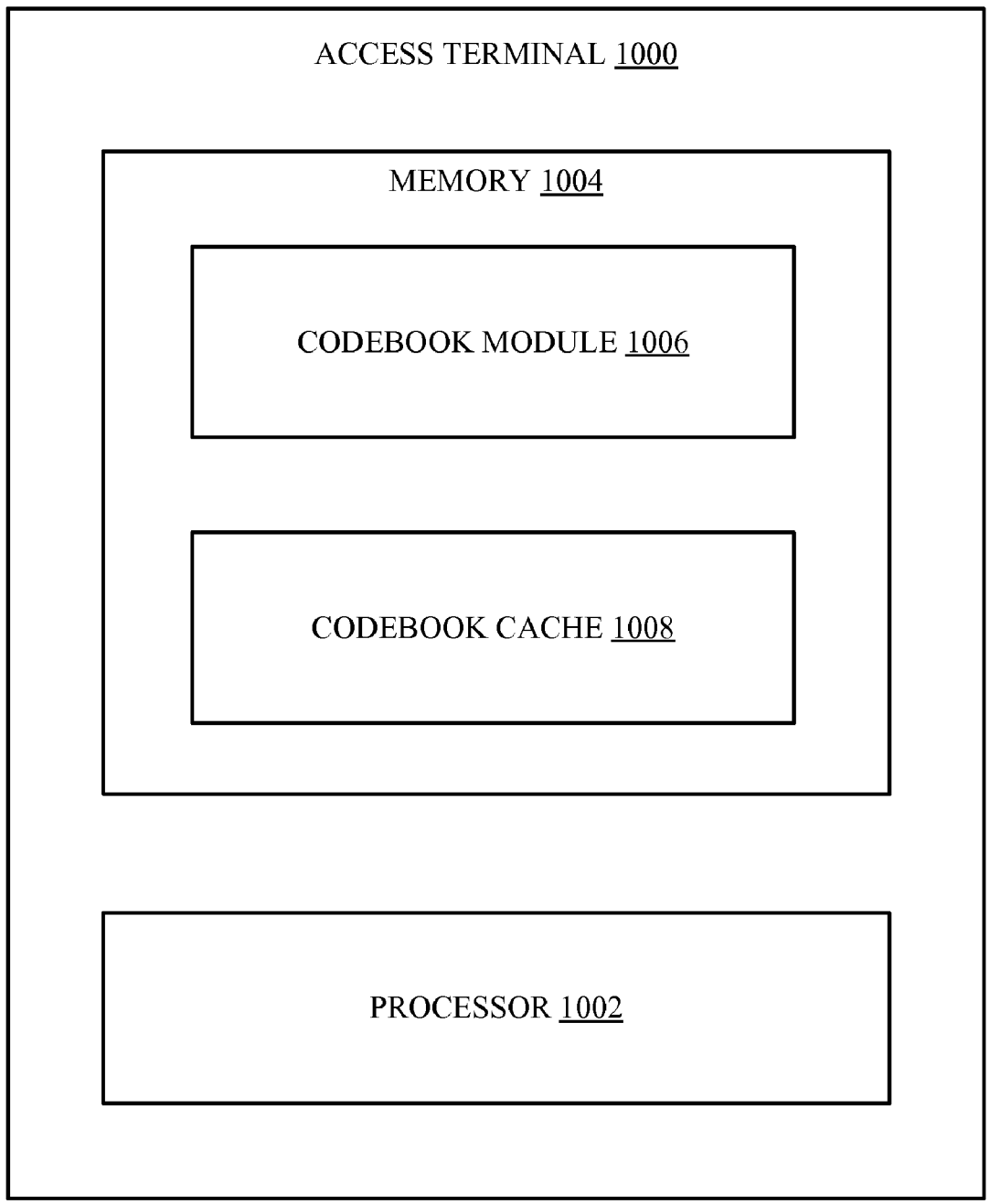
FIG. 10 is a block diagram of an access terminal for receiving and storing codebooks in a multiple access wireless communication system in accordance with various aspects.

FIG. 10 depicts a block diagram of an access terminal 1000, according to various aspects. The access terminal may comprise any type of computerized, communication device, such as cellular telephone, Personal Digital Assistant (PDA), two-way text pager, portable computer, and even a separate computer platform that has a wireless communications portal, and which also may have a wired connection to a network or the Internet. The access terminal can be a remote-slave, or other device that does not have an end-user thereof but simply communicates data across the wireless network, such as remote sensors, diagnostic tools, data relays, and the like. The present apparatus and methods can accordingly be performed on any form of wireless communication device or wireless computer module, including a wireless communication portal, including without limitation, wireless modems, PCMCIA cards, wireless devices or any combination or sub-combination thereof.

The access terminal 1000 includes at least one processor 1002 and memory 1004 coupled to processor 1002. The processor 1002 may be an application-specific integrated circuit ("ASIC"), or other chipset, processor, logic circuit, or other data processing device. The memory 1004 may comprise volatile and nonvolatile memory such as read-only and/or random-access memory (RAM and ROM), EPROM, EEPROM, flash cards, or any memory common to computer platforms. Further, memory 1004 may include one or more flash memory cells, or may be any secondary or tertiary storage device, such as magnetic media, optical media, tape, or soft or hard disk.

The access terminal 1000 additionally includes a codebook module 1006 stored in the memory 1004 and executable by the at least processor 1002. The codebook module 1006 is operable to receive a codebook including a plurality of preferred precoding matrices. Additionally, the codebook module 1006 may be operable to receive and respond to codebook queries to inform access networks of currently cached codebooks. Also, the codebook module 1006 may be operable to assign one of the cached codebooks to a predetermined sector of the active set of communication links.

The access terminal 1000 additionally includes a codebook cache 1008 stored in the memory 1004 and executable by the at least processor 1002. The codebook cache 1008 is operable to store the received codebooks in memory. As previously noted, the received codebooks will remain in the cache for the duration of the power-up period and may be placed in the cache during an idle state. The access terminal may additionally be configured to delete the codebook based on access terminal location or a maximum time setting; however, typically an assigned codebook may not be deleted from the cache.

Figure 11:
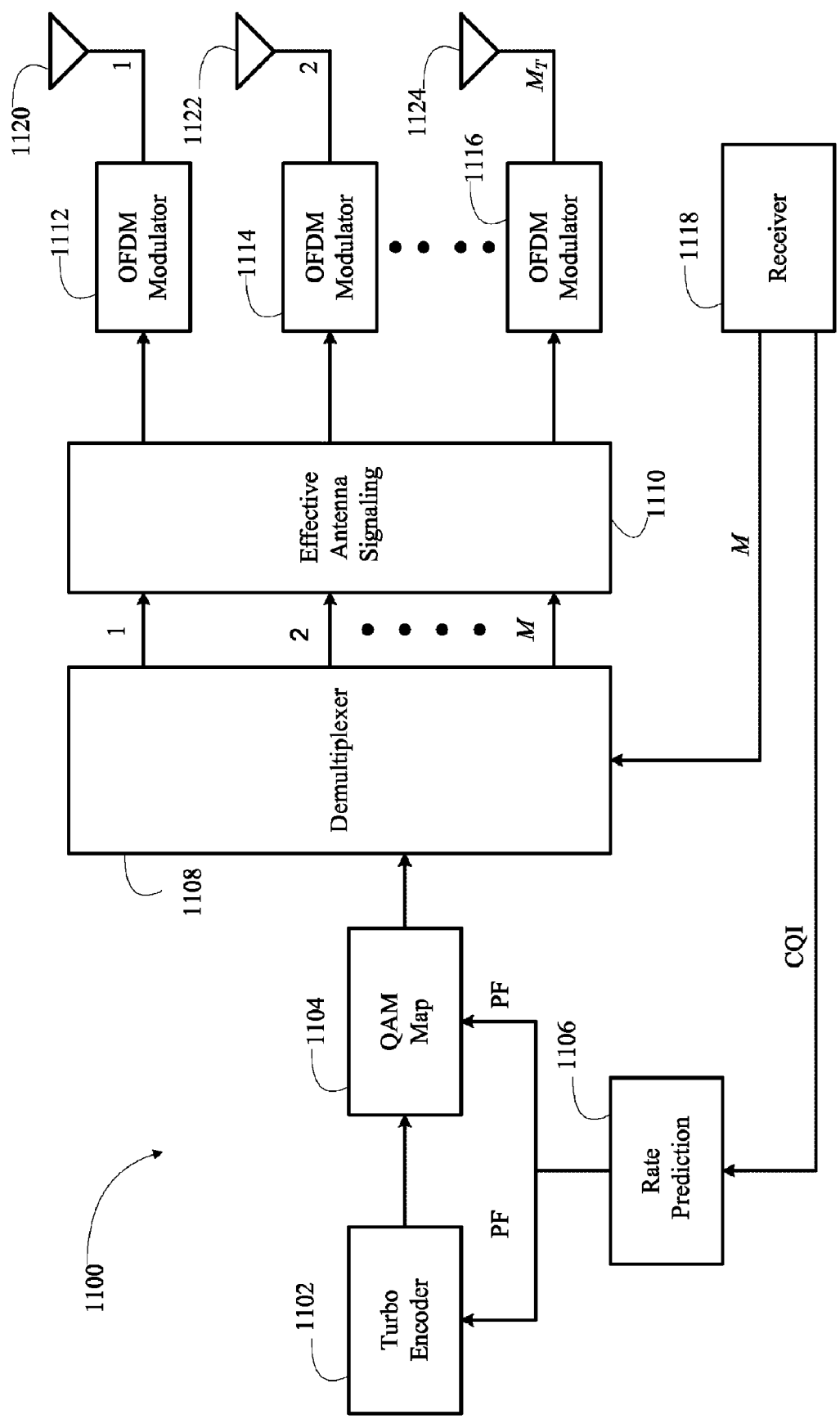
FIG. 11 illustrates a block diagram of a single codeword (SCW) Multiple Input, Multiple Output (MIMO) transmitter in accordance with various aspects described herein.

FIG. 11 is a block diagram representation of the transmitter 1100 (e.g., access network) in a single codeword (SCW) Multiple Input, Multiple Output (MIMO), according to a present aspect. The input data stream is in communication with turbo encoder 1102 that use the selected code rate inputted from rate prediction module 1106. The turbo encoded data stream is then mapped to the selected QAM (Quadrature Amplitude Modulation) constellation at QMA mapping module 1104. The stream of modulation symbols is then demultiplexed to parallel sub-streams at demultiplexer 1108. The M number (M being defined by receiver 1118) of sub-streams outputted by demultiplexer 1108 are mapped to the physical antennae using the effective antenna signaling module 1110, thus adapting the rate and rank to channel realizations. The sub-streams then undergo individual Orthogonal Frequency-Division Multiplexing (OFDM) modulation at individual OFSM modulators 112, 114 and 116. Once modulated, the sub-streams are transmitted via corresponding antennae 1120, 1122 and 1124.

Figure 12:
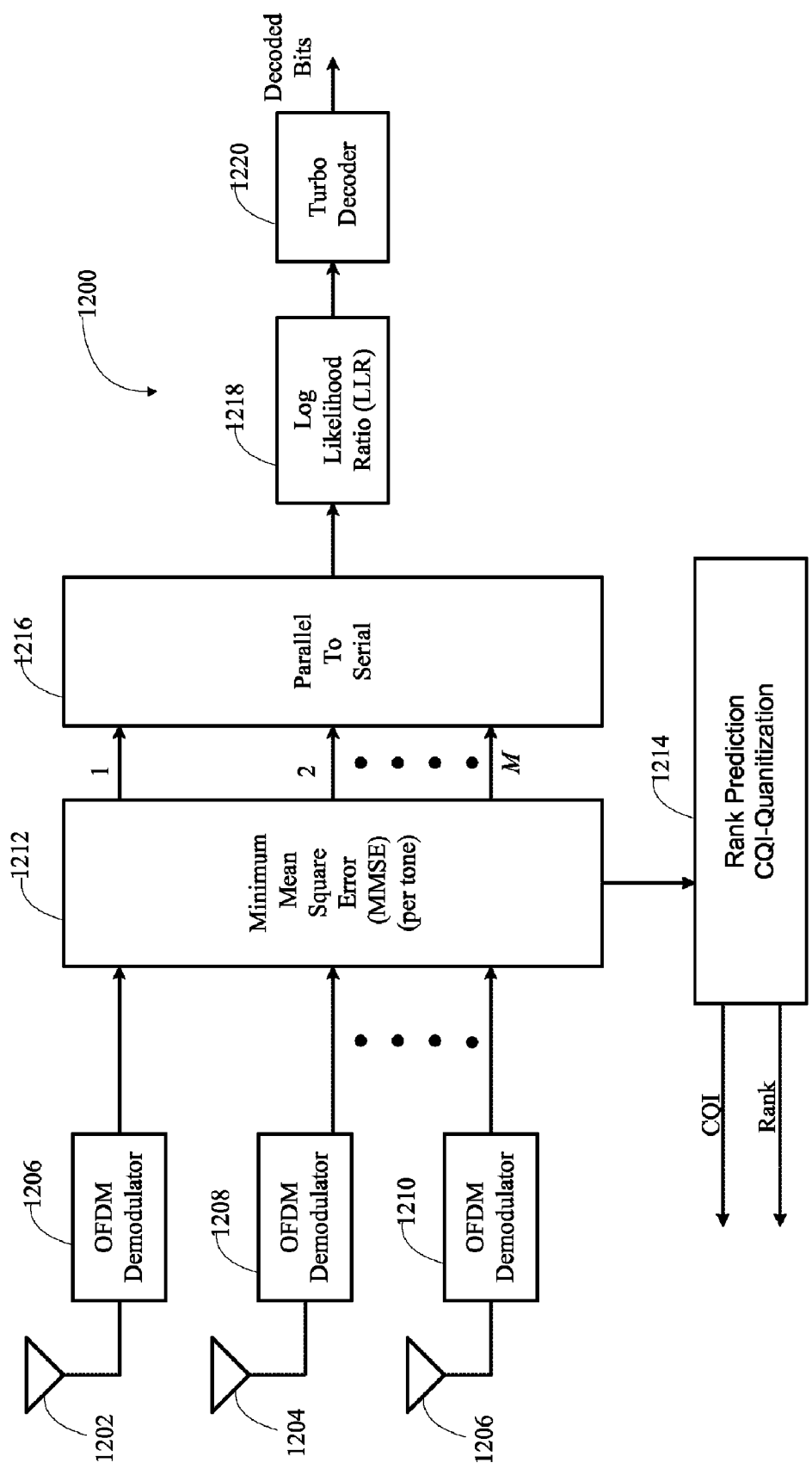
FIG. 12 illustrates a block diagram of a single codeword (SCW) Multiple Input, Multiple Output (MIMO) receiver in accordance with various aspects described herein.

FIG. 12 is a block diagram representation of the receiver 1200 (e.g., access terminal) in a single codeword (SCW) Multiple Input, Multiple Output (MIMO), according to a present aspect. The transmitted sub-streams are received across antennae 1202, 1204 and 1206 and undergo OFDM demodulation at corresponding OFDM demodulators 1206, 1208 and 1208. The demodulated sub-streams are subsequently communicated to the MMSE (Minimum Mean Square Error) module 1212 that implements a linear MMSE filter on the received demodulated sub-streams. The results of the linear MMSE filtering are communicated to the rank prediction CQI-Quantization module for 1214 rank and CQI determination. The MMSE module 1212, in conjunction with the parallel to serial module 1216 decouple the incoming M sub-streams and provide soft estimates of the modulation symbols. The soft estimates of the modulation symbols are then communicated to LLR computer 1218 and the output is communicated to turbo decoder 1220, resulting in decoded bits. The receiver can employ more sophisticated detectors; however, the complexity may be relatively low if only linear MMSE is employed.

Figure 13:
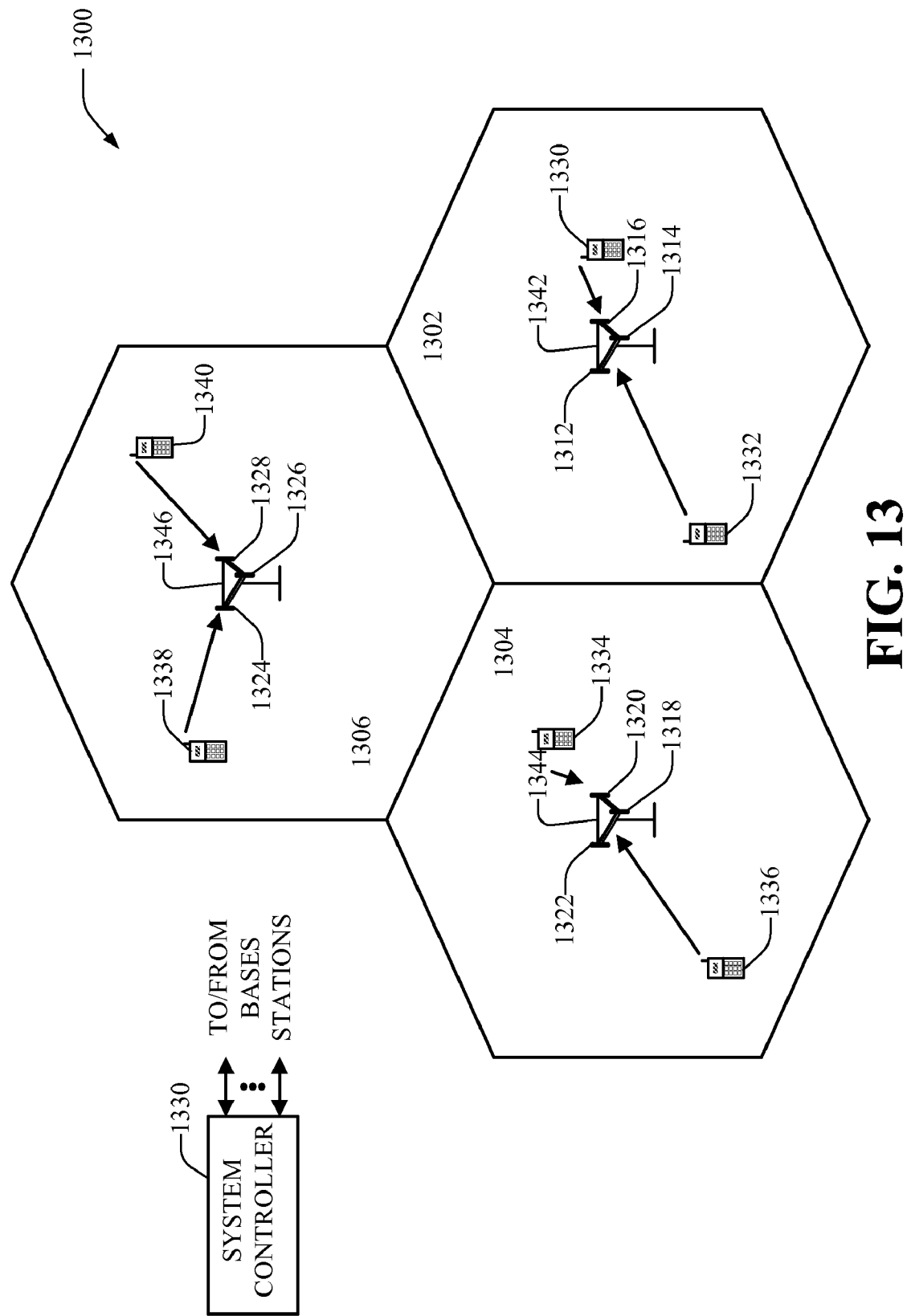
FIG. 13 illustrates a multiple access wireless communication system according to various aspects described herein.

FIG. 13 illustrates an exemplary multiple access wireless communication system. A multiple access wireless communication system 1300 includes multiple cells, e.g. cells 1302, 1304, and 1306. In the exemplary system illustrated in FIG. 13, each cell 1302, 1304, and 1306 may include an access point 1350 that includes multiple sectors. The multiple sectors are formed by groups of antennas each responsible for communication with access terminals in a portion of the cell. In cell 1302, antenna groups 1312, 1314, and 1316 each correspond to a different sector. In cell 1304, antenna groups 1318, 1320, and 1322 each correspond to a different sector. In cell 1306, antenna groups 1324, 1326, and 1328 each correspond to a different sector.

Each cell includes several access terminals, which are in communication with one or more sectors of each access network. For example, access terminals 1330 and 1332 are in communication with access point (or base station) 1342, access terminals 1334 and 1336 are in communication with access network 1344, and access terminals 1338 and 1340 are in communication with access network 1346.

As illustrated in FIG. 13 each access terminal 1330, 1332, 1334, 1336, 1338, and 1340 is located in a different portion of its respective cell than each other access terminal in the same cell. Further, each access terminal may be a different distance from the corresponding antenna groups with which it is communicating. Both of these factors provide situations, also due to environmental and other conditions in the cell, to cause different channel conditions to be present between each access terminal and its corresponding antenna group with which it is communicating.

As used herein, an access point may be a fixed station used for communicating with the terminals and may also be referred to as, and include some or all the functionality of, a base station, a Node B, or some other terminology. An access terminal may also be referred to as, and include some or all the functionality of, a user equipment (UE), a wireless communication device, terminal, a mobile station, a access terminal, or some other terminology.

In one example, a set of known beams may be utilized at the base-station in order to provide SDMA, e.g. fixed or adaptive sectors. If the access network is aware of the best beam for every user, it can allocate the same channel for different users if they are to be receiving data on different beams. In another example, system 1300 may include an omni-directional beam that corresponds to no pre-coding. The access network would use this beam for broadcast or multicast transmissions. In still another example, the system 1300 may utilize pre-coding without SDMA if such channel information is reported to the user.

This channel information can be used by the access terminal to compute the beam preferred by it and indicating this beam to the access network. Even without power allocation, knowing the channel at the transmitter improves capacity especially for those systems where the number of transmit antennas $T_M$ is greater than the number of receive antennas $R_M$. The capacity improvement is obtained by transmitting along the directions of the channel Eigen vectors. Feeding back the channel requires overhead.

SDMA provides a sufficiently rich set of beams at the transmitter that allows full flexibility in scheduling. The users are scheduled on beams that are signaled to the access network through some feedback mechanism. For efficient scheduling, the transmitter should have the channel quality information over each user if a certain beam is used to schedule the user.

Figure 14:
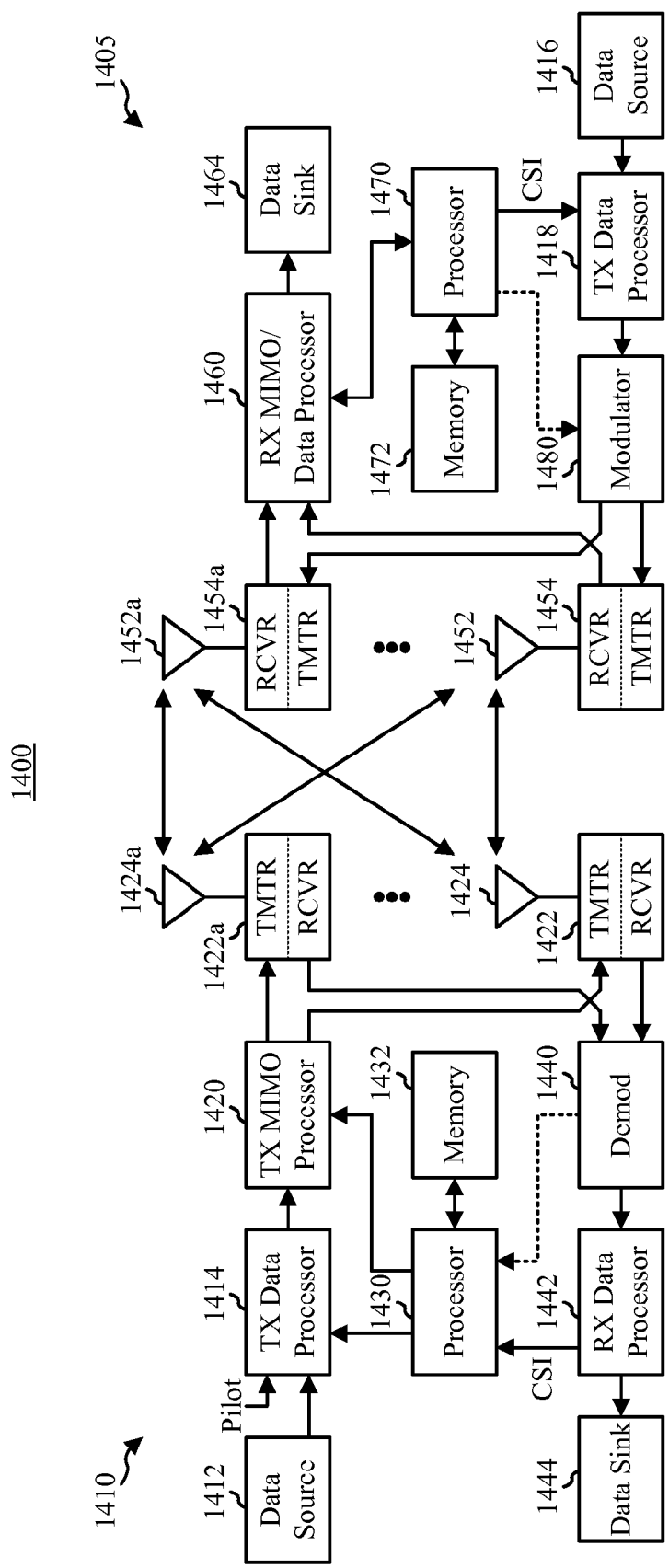
FIG. 14 illustrates a transmitter and a receiver in a multiple access wireless communication system in accordance with the various aspects.

FIG. 14 illustrates a transmitter and receiver in a multiple access wireless communication system 1400 according to various aspects presented herein. Wireless communication system 1400 depicts one access network and one user device for sake of brevity. However, it is to be appreciated that the system can include more than one access network and/or more than one user device, wherein additional access networks and/or user devices can be substantially similar or different from the exemplary access network and user device described below. In addition, it is to be appreciated that the access network and/or the user device can employ the systems and/or methods described herein to facilitate wireless communication there between.

At transmitter system 1410, traffic data for a number of data streams is provided from a data source 1412, which includes the codebook of present aspects, to a transmit (TX) data processor 1414. In some aspects, each data stream is transmitted over a respective transmit antenna. TX data processor 1414 formats, codes, and interleaves the traffic data for each data stream based on a particular coding scheme selected for that data stream to provide coded data. In some aspects, TX data processor 1414 applies beam-forming weights to the symbols of the data streams based upon the user to which the symbols are being transmitted and the antenna from which the symbol is being transmitted. In some aspects, the beam-forming weights may be generated based upon channel response information that is indicative of the condition of the transmission paths between the access network and the access terminal. The channel response information may be generated utilizing CQI (Channel Quality Indicator) information or channel estimates provided by the user. Further, in those cases of scheduled transmissions, the TX data processor 1414 can select the packet format based upon rank information that is transmitted from the user.

The coded data for each data stream may be multiplexed with pilot data using OFDM (Orthogonal Frequency Division Multiplexing) techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed or provided by processor 1430. In some aspects, the number of parallel spatial streams may be varied according to the rank information that is transmitted from the user.

The modulation symbols for the data streams are provided to a TX MIMO processor 1420, which may further process the modulation symbols (e.g., for OFDM). TX MIMO processor 1420 provides NT symbol streams to NT transmitters (TMTR) 1422*a* through 1422*t*. In some aspects, TX MIMO processor 1420 applies beam-forming weights to the symbols of the data streams based upon the user to which the symbols are being transmitted and the antenna from which the symbol is being transmitted from that users channel response information.

Each transmitter 1422 receives and processes a respective symbol stream to provide one or more analog signals, and further conditions (e.g., amplifies, filters, and upconverts) the analog signals to provide a modulated signal suitable for transmission over the MIMO channel. NT modulated signals from transmitters 1422*a* through 1422*t* are transmitted from NT antennas 1424*a* through 1424*t*, respectively.

At receiver system 1450, the transmitted modulated signals are received by NR antennas 1452*a* through 1452*r* and the received signal from each antenna 1452 is provided to a respective receiver (RCVR) 1454. Each receiver 1454 conditions (e.g., filters, amplifies, and downconverts) a respective received signal, digitizes the conditioned signal to provide samples, and further processes the samples to provide a corresponding "received" symbol stream.

An RX data processor 1460 then receives and processes the NR received symbol streams from NR receivers 1454 based on a particular receiver processing technique. The processing by RX data processor 1460 is described in further detail below. Each detected symbol stream includes symbols that are estimates of the modulation symbols transmitted for the corresponding data stream. RX data processor 1460 then demodulates, deinterleaves, and decodes each detected symbol stream to recover the traffic data for the data stream. The processing by RX data processor 1460 is complementary to that performed by TX MIMO processor 1420 and TX data processor 1414 at transmitter system 1410.

The channel response estimate generated by RX processor 1460 may be used to perform space, space/time processing at the receiver, adjust power levels, change modulation rates or schemes, or other actions. RX processor 1460 may further estimate the signal-to-noise-and-interference ratios (SNRs) of the detected symbol streams, and possibly other channel characteristics, and provides these quantities to a processor 1470. RX data processor 1460 or processor 1470 may further derive an estimate of the "effective" SNR for the system. Processor 1470 then provides estimated channel information (CSI), which may comprise various types of information regarding the communication link and/or the received data stream. For example, the CSI may comprise only the operating SNR and/or the rank. The CSI is then processed by a TX data processor 1418, which also receives traffic data for a number of data streams from a data source 1416, modulated by a modulator 1480, conditioned by transmitters 1454a through 1454r, and transmitted back to transmitter system 1410.

At transmitter system 1410, the modulated signals from receiver system 1450 are received by antennas 1424, conditioned by receivers 1422, demodulated by a demodulator 1440, and processed by a RX data processor 1442 to recover the CSI reported by the receiver system. The reported CSI is then provided to processor 1430 and used to (1) determine the data rates and coding and modulation schemes to be used for the data streams and (2) generate various controls for TX data processor 1414 and TX MIMO processor 1420.

At the receiver, various processing techniques may be used to process the NR received signals to detect the NT transmitted symbol streams. These receiver processing techniques may be grouped into two primary categories (i) spatial and space-time receiver processing techniques (which are also referred to as equalization techniques); and (ii) "successive nulling/equalization and interference cancellation" receiver processing technique (which is also referred to as "successive interference cancellation" or "successive cancellation" receiver processing technique).

A MIMO channel formed by the NT transmit and NR receive antennas may be decomposed into $N_S$ independent channels, with $N_S \leq \min\{N_T, N_R\}$. Each of the $N_S$ independent channels may also be referred to as a spatial subchannel (or a transmission channel) of the MIMO channel and corresponds to a dimension.

Figure 15:
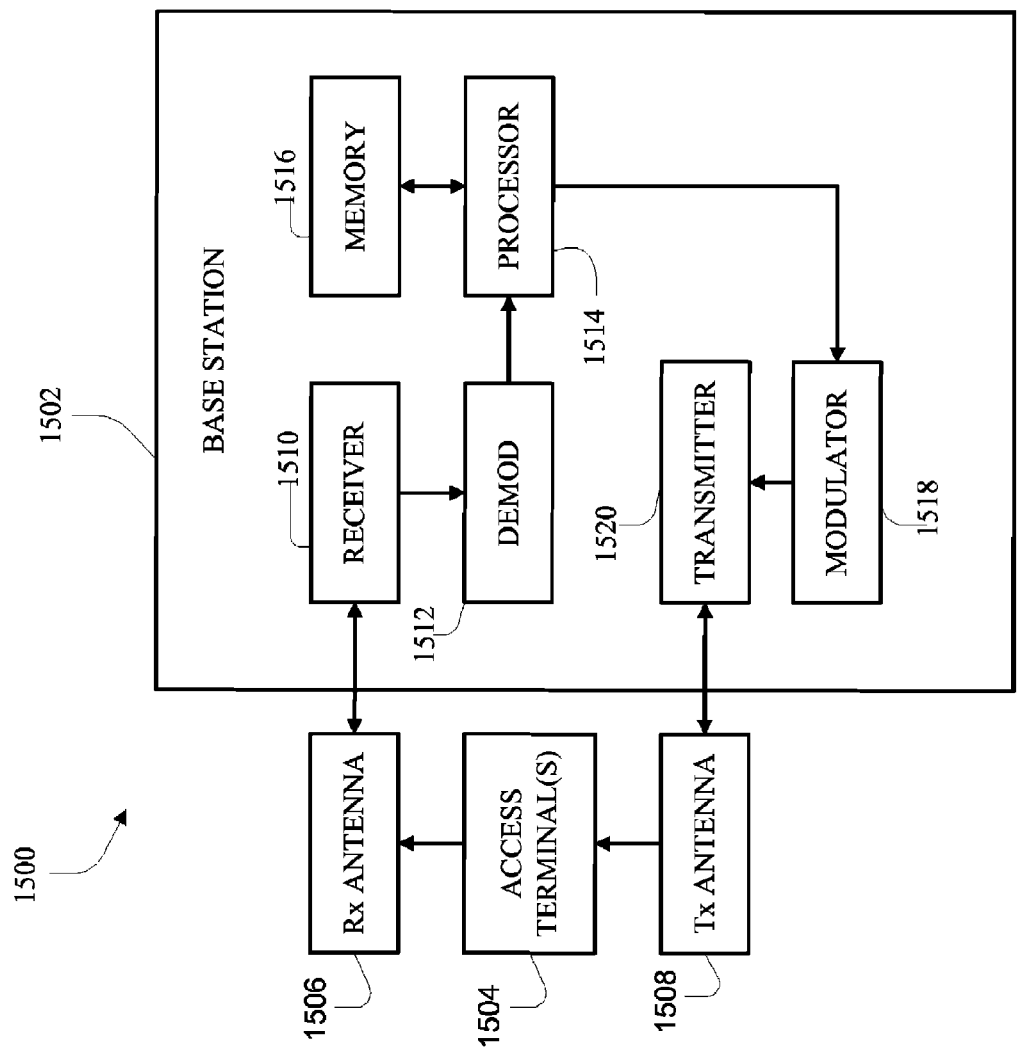
FIG. 15 is a block diagram of a system that coordinates generation and transmission of acquisition information in accordance with various aspects.

FIG. 15 illustrates a system for codebook exchange in a wireless communication environment in accordance with the various aspects. System 1500 comprises an access network 1502 with a receiver 1510 that receives signal(s) from one or more user devices 1504 (e.g., access terminals) through one or more receive antennas 1506, and transmits to the one or more user devices 1504 through a plurality of transmit antennas 1508. In one or more aspects, receive antennas 1506 and transmit antennas 1508 can be implemented using a single set of antennas. Receiver 1510 can receive information from receive antennas 1506 and is operatively associated with a demodulator 1512 that demodulates received information. Receiver 1510 can be, for example, a Rake receiver (e.g., a technique that individually processes multi-path signal components using a plurality of baseband correlators), an MMSE (Minimum Mean Square Error)-based receiver, or some other suitable receiver for separating out user devices assigned thereto, as will be appreciated by one skilled in the art. According to various aspects, multiple receivers can be employed (e.g., one per receive antenna), and such receivers can communicate with each other to provide improved estimates of user data. Demodulated symbols are analyzed by a processor 1514 that is similar to the processor described infra. with regard to FIG. 16, and is coupled to a memory 1516 that stores information related to user device assignments, lookup tables related thereto and the like.

Receiver output for each antenna can be jointly processed by receiver 1510 and/or processor 1514. A modulator 1518 can multiplex the signal for transmission by a transmitter 1520 through transmit antennas 1508 to user devices 1504.

Figure 16:
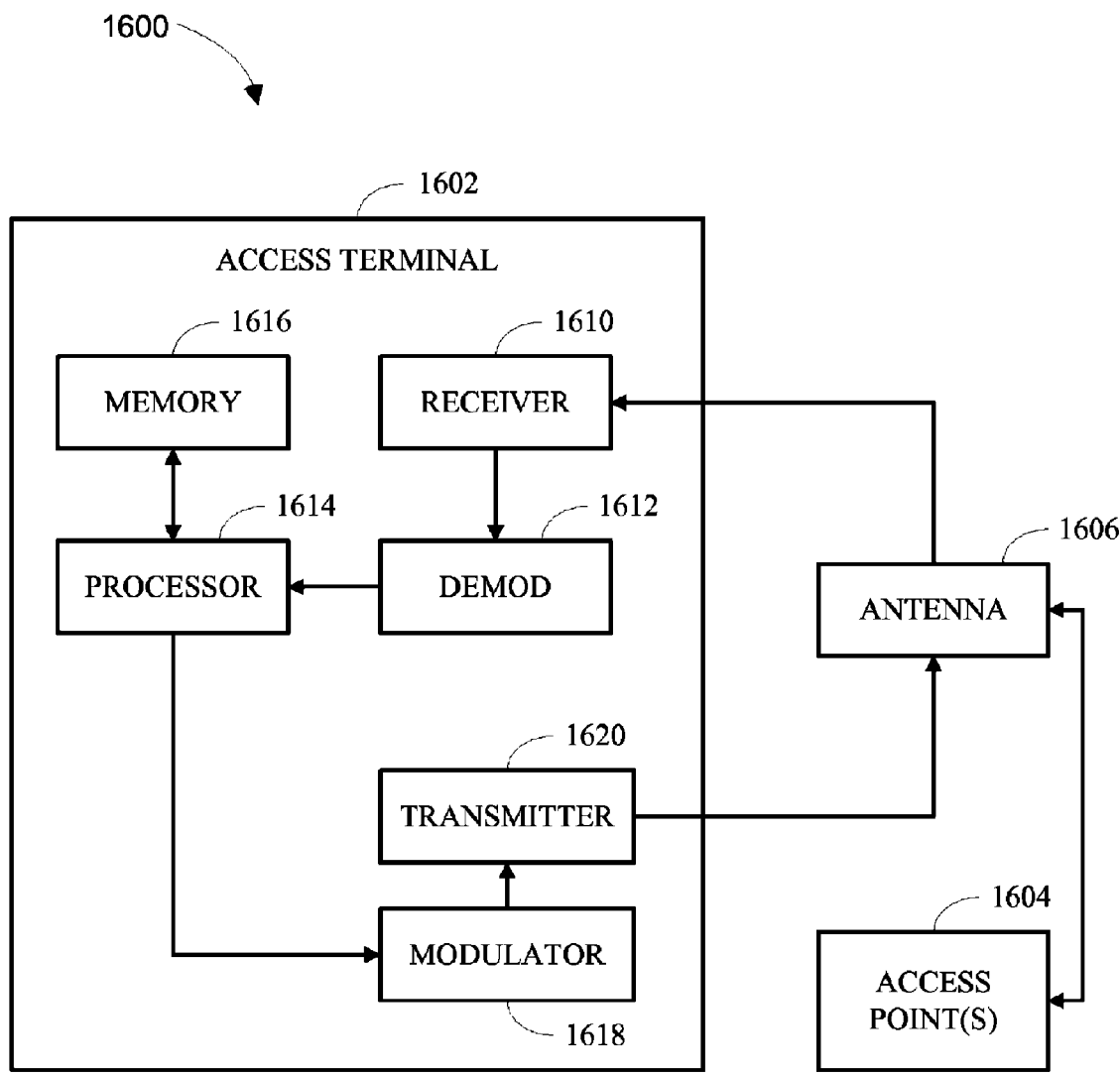
FIG. 16 is a block diagram of a system that coordinates signal acquisition in a wireless communication environment in accordance with various aspects.

FIG. 16 is a block diagram of a system 1600 that coordinates signal acquisition in a wireless communication environment in accordance with various aspects described herein. In one example, system 1600 includes an access terminal 1602. As illustrated, access terminal 1602 can receive signal(s) from one or more access networks 1604 and transmit to the one or more access networks 1604 via an antenna 1606. Additionally, access terminal 1602 can comprise a receiver 1610 that receives information from antenna 1606. In one example, receiver 1610 can be operatively associated with a demodulator (Demod) 1612 that demodulates received information. Demodulated symbols can then be analyzed by a processor 1614. Processor 1614 can be coupled to memory 1616, which can store data and/or program codes related to access terminal 1602. Additionally, access terminal 1602 can employ processor 1614 to perform herein described methodologies and/or other appropriate methodologies. Access terminal 1602 can also include a modulator 1618 that can multiplex a signal for transmission by a transmitter 1620 via antenna 1606 to one or more access networks 1604.

It is to be understood that the aspects described herein may be implemented by hardware, software, firmware, middleware, microcode, or any combination thereof. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method for codebook exchange in a multiple access wireless communication system, comprising:
   providing for a plurality of preferred precoding matrices;
   generating a codebook at an access network, wherein the codebook comprises the plurality of preferred precoding matrices; and
   communicating the codebook to one or more access terminals;
   wherein communicating the codebook further comprises:
      querying the one or more access terminals to determine an identity of one or more codebooks currently stored at each access terminal;
      receiving a codebook status response from each of the one or more access terminals indicating the identity of one or more codebooks stored at each of the one or more access terminals; and communicating the codebook to one or more access terminals if the codebook status response indicates that the codebook is not currently stored at the one or more access terminals.

2. The method of claim 1, wherein generating a codebook further comprises generating a codebook, wherein the codebook is identified by a codebook identifier assigned by the access network.

3. The method of claim 2, wherein generating a codebook further comprises generating a codebook, wherein the codebook is identified by a sixteen (16)-bit codebook identifier assigned by the access network.

4. The method of claim 1, wherein receiving a codebook status response further comprises receiving a codebook status response from each of the one or more access terminals indicating the identity of one or more codebooks stored at each of the one or more access terminals, wherein the identity is defined by a codebook identifier.

5. The method of claim 1, further comprising assigning the codebook to one or more access terminals for a predetermined sector in the active set of communication links.

6. The method of claim 5, wherein assigning the codebook for a predetermined sector in the active set of communication links further comprises:

querying the one or more access terminals to determine an identity of one or more codebooks currently stored at each access terminal;

receiving a codebook status response from each of the one or more access terminals indicating the identity of one or more codebooks stored at each of the one or more access terminals; and assigning the codebook to one or more access terminals for a predetermined sector in the active set of communication links, if the codebook status response for the one or more access terminals indicates that the codebook is currently stored at the one or more access terminals.

7. The method of claim 1, wherein generating a codebook further comprises generating a codebook, wherein the codebook includes identification of one or more clusters.

8. The method of claim 7, wherein generating a codebook further comprises generating a codebook, wherein each of the one or more clusters identify a set of the precoding matrices and a set of beams in the cluster.

9. The method of claim 8, wherein generating a codebook further comprises generating a codebook, wherein each of the one or more clusters identify a starting beam index and an ending beam index.

10. The method of claim 7, wherein generating a codebook further comprises generating a codebook, wherein the codebook includes an overlap cluster map that indicates one or more clusters authorized to potentially overlap.

11. An apparatus for generating and communicating codebooks in a multiple access wireless communication system, comprising:

means for providing for a plurality of preferred precoding matrices;

means for generating a codebook at an access network, wherein the codebook comprises a plurality of preferred precoding matrices; and means for communicating the codebook to one or more access terminals;

wherein the means for communicating the codebook further comprises:

means for querying the one or more access terminals to determine an identity of one or more codebooks currently stored at each access terminal;

means for receiving a codebook status response from each of the one or more access terminals indicating the identity of one or more codebooks stored at each of the one or more access terminals; and means for communicating the codebook to one or more access terminals if the codebook status response indicates that the codebook is not currently stored at the one or more access terminals.

12. A non-transitory computer-readable medium comprising a computer executable including instructions for:

causing a computer to provide for a plurality of preferred precoding matrices;

causing a computer to generate a codebook at an access network, wherein the codebook comprises a plurality of preferred precoding matrices; and causing a computer to communicate the codebook to one or more access terminals;

wherein the instructions for causing the computer to communicate the codebook further comprises instructions for causing the computer to:

query the one or more access terminals to determine an identity of one or more codebooks currently stored at each access terminal;

receive a codebook status response from each of the one or more access terminals indicating the identity of one or more codebooks stored at each of the one or more access terminals; and communicate the codebook to one or more access terminals if the codebook status response indicates that the codebook is not currently stored at the one or more access terminals.

13. An integrated circuit that executes computer-executable instructions for generating and communicating codebooks in a multiple access wireless communication system, the instructions comprising:

providing for a plurality of preferred precoding matrices;

generating a codebook at an access network, wherein the codebook comprises a plurality of preferred precoding matrices; and communicating the codebook to one or more access terminals;

wherein the communicating the codebook further comprises:

querying the one or more access terminals to determine an identity of one or more codebooks currently stored at each access terminal;

receiving a codebook status response from each of the one or more access terminals indicating the identity of one or more codebooks stored at each of the one or more access terminals; and communicating the codebook to one or more access terminals if the codebook status response indicates that the codebook is not currently stored at the one or more access terminals.

14. An access network apparatus for generating and communicating codebooks in a multiple access communication network, comprising:

at least one processor;

a memory coupled to the at least one processor;

a codebook generator stored in the memory and executable by the at least one processor, wherein the codebook generator is operable to provide for a plurality of preferred precoding matrices and generate a codebook that includes a plurality of preferred precoding matrices; and a codebook exchanger stored in the memory and executable by the at least one processor, wherein the exchanger is operable to communicate the codebook to the one or more access terminal;

wherein the codebook exchanger is further operable to query the one or more access terminals to determine an identity of one or more codebooks currently stored at each access terminal, receive a codebook status response from each of the one or more access terminals indicating the identity of one or more codebooks stored at each of the one or more access terminals and communicate the codebook to one or more access terminals if the codebook status response indicates that the codebook is not currently stored at the one or more access terminals.

15. The apparatus of claim 14, wherein the codebook generator is further operable to generate a codebook including a sixteen-bit codebook identifier.

16. The apparatus of claim 14, wherein the codebook exchanger is further operable to receive a codebook status response from each of the one or more access terminals indicating the identity of one or more codebooks stored at each of the one or more access terminals, wherein the identity is defined by a codebook identifier.

17. The apparatus of claim 14, wherein the codebook exchanger is further operable to assign the codebook to one or more access terminals for a predetermined sector in the active set of communication links.

18. The apparatus of claim 17, wherein the codebook exchanger is further operable to query the one or more access terminals to determine an identity of one or more codebooks currently stored at each access terminal, receive a codebook status response from each of the one or more access terminals indicating the identity of one or more codebooks stored at each of the one or more access terminals and assign the codebook to one or more access terminals for a predetermined sector in the active set of communication links, if the codebook status response for the one or more access terminals indicates that the codebook is currently stored at the one or more access terminals.

19. The apparatus of claim 14, wherein the codebook generator is further operable to generate a codebook, wherein the codebook includes identification of one or more clusters.

20. The apparatus of claim 19, wherein the codebook generator is further operable to generate a codebook, wherein each of the one or more clusters identify a set of the precoding matrices and a set of beams in the cluster.

21. The apparatus of claim 20, wherein the codebook generator is further operable to generate a codebook, wherein each of the one or more clusters identify a starting beam index and an ending beam index.

22. The apparatus of claim 19, wherein the codebook generator is further operable to generate a codebook, wherein the codebook includes an overlap cluster map that indicates one or more clusters authorized to potentially overlap.

23. A method for receiving a codebook associated with a multiple access wireless communication system, comprising:

receiving a codebook from an access network, wherein the codebook includes one or more preferred precoding matrices; and storing the received codebook in a codebook cache;

wherein receiving the codebook further comprises:

receiving a query from an access network to identify of one or more codebooks currently stored in the codebook cache;

responding to the query with the identification of the one or more codebooks currently stored in the codebook cache; and receiving the codebook from the access network, if the identification of the one or more codebooks currently stored in the codebook cache does not include the codebook associated with the access network.

24. The method of claim 23, wherein receiving a codebook further comprises receiving a codebook from an access network, wherein the codebook has an associated codebook identifier.

25. The method of claim 23, wherein receiving a codebook further comprises receiving a codebook from an access network, wherein the codebook has an associated sixteen (16)-bit codebook identifier.

26. The method of claim 23, wherein responding to the query with the identification of the one or more codebooks further comprises responding to the query with the identification of the one or more codebooks currently stored in the codebook cache, wherein the identification is defined by a codebook identifier for each of the one or more codebooks.

27. The method of claim 23, further comprising receiving a codebook assignment from an access network associated with a codebook stored in the codebook cache, wherein the codebook assignment assigns the codebook for a predetermined sector in the active set of communication links.

28. The method of claim 23, wherein assigning the codebook for a predetermined sector in the active set of communication links further comprises:

receiving a query from an access network to identify the one or more codebooks currently stored in the codebook cache;

responding to the query with the identification of the one or more codebooks currently stored in the codebook cache; and receiving a codebook assignment from an access network that assigns the codebook for a predetermined sector in the active set of communication links, if the response to the query indicates that the codebook is currently stored in the codebook cache.

29. The method of claim 23, wherein receiving a codebook from an access network further comprises receiving a codebook from an access network, wherein the codebook includes identification of one or more clusters.

30. The method of claim 29, wherein receiving a codebook from an access network further comprises receiving a codebook from an access network, wherein each of the one or more clusters identify a set of the precoding matrices and a set of beams in the cluster.

31. The method of claim 30, wherein receiving a codebook from an access network further comprises receiving a codebook from an access network, wherein each of the one or more clusters identify a starting beam index and a ending beam index.

32. The method of claim 29, wherein receiving a codebook from an access network, further comprises receiving a codebook from an access network, wherein the codebook includes an overlap cluster map that indicates one or more clusters authorized to potentially overlap.

33. An apparatus for receiving and storing codebooks in a multiple access wireless communication system, comprising:

means for receiving a codebook from an access network, wherein the codebook includes one or more preferred precoding matrices; and means for storing the received codebook in a codebook cache;

wherein the means for receiving the codebook further comprises:
  means for receiving a query from an access network to identify of one or more codebooks currently stored in the codebook cache;
  means for responding to the query with the identification of the one or more codebooks currently stored in the codebook cache; and
  means for receiving the codebook from the access network, if the identification of the one or more codebooks currently stored in the codebook cache does not include the codebook associated with the access network.

34. A non-transitory computer-readable medium comprising a computer executable including instructions for:
  causing a computer to receive a codebook from an access network, wherein the codebook includes one or more preferred precoding matrices; and
  causing a computer to store the received codebook in a codebook cache;
  wherein the instruction for causing the computer to receive the codebook further comprises instructions for causing the computer to:
    receive a query from an access network to identify of one or more codebooks currently stored in the codebook cache;
    respond to the query with the identification of the one or more codebooks currently stored in the codebook cache; and
    receive the codebook from the access network, if the identification of the one or more codebooks currently stored in the codebook cache does not include the codebook associated with the access network.

35. An integrated circuit that executes computer-executable instructions for receiving and storing codebooks in a multiple access wireless communication system, the instructions comprising:
  receiving a codebook from an access network, wherein the codebook includes one or more preferred precoding matrices; and
  storing the received codebook in a codebook cache;
  wherein the receiving the codebook further comprises:
    receiving a query from an access network to identify of one or more codebooks currently stored in the codebook cache;
    responding to the query with the identification of the one or more codebooks currently stored in the codebook cache; and
    receiving the codebook from the access network, if the identification of the one or more codebooks currently stored in the codebook cache does not include the codebook associated with the access network.

36. An access terminal apparatus for receiving and storing codebooks for a multiple access wireless communication system, comprising:
  at least one processor;
  a memory coupled to the at least one processor;
  a codebook module stored in the memory and executable by the at least one processor, wherein the codebook module is operable to receive a codebook from an access network, wherein the codebook includes one or more preferred precoding matrices; and
  a codebook cache stored in the memory and operable for storing the received codebook;
  wherein the codebook module operable to receive the codebook is further operable to receive a query from an access network to identify of one or more codebooks currently stored in the codebook cache, respond to the query with the identification of the one or more codebooks currently stored in the codebook cache and receive the codebook from the access network, if the identification of the one or more codebooks currently stored in the codebook cache does not include the codebook associated with the access network.

37. The apparatus of claim 36, wherein the codebook module is further operable to receive a codebook from an access network, wherein the codebook has an associated codebook identifier.

38. The apparatus of claim 36, wherein the codebook module is further operable to receive a codebook from an access network, wherein the codebook has an associated sixteen (16)-bit codebook identifier.

39. The apparatus of claim 36, wherein the codebook module operable to respond to the query with the identification of the one or more codebooks is further operable to respond to the query with the identification of the one or more codebooks currently stored in the codebook cache, wherein the identification is defined by a codebook identifier for each of the one or more codebooks.

40. The apparatus of claim 36, wherein the codebook module is further operable to receive a codebook assignment from an access network associated with a codebook stored in the codebook cache, wherein the codebook assignment assigns the codebook for a predetermined sector in the active set of communication links.

41. The apparatus of claim 36, wherein the codebook module operable to receive a codebook assignment is further operable to receive a query from an access network to identify the one or more codebooks currently stored in the codebook cache, respond to the query with the identification of the one or more codebooks currently stored in the codebook cache and receive a codebook assignment from an access network that assigns the codebook for a predetermined sector in the active set of communication links, if the response to the query indicates that the codebook is currently stored in the codebook cache.

42. The apparatus of claim 36, wherein the codebook module is further operable to receive a codebook from an access network, wherein the codebook includes identification of one or more clusters.

43. The apparatus of claim 42, wherein the codebook module is further operable to receive a codebook from an access network, wherein each of the one or more clusters identify a set of the precoding matrices and a set of beams in the cluster.

44. The apparatus of claim 43, wherein the codebook module is further operable to receive a codebook from an access network, wherein each of the one or more clusters identify a starting beam index and an ending beam index.

45. The apparatus of claim 36, wherein the codebook module is further operable to receive a codebook from an access network, wherein the codebook includes an overlap cluster map that indicates one or more clusters authorized to potentially overlap.

* * * * *